United States Patent
Wang

(10) Patent No.: US 12,127,252 B2
(45) Date of Patent: Oct. 22, 2024

(54) CONTROL SIGNALLING FOR TRANSMISSION IN A CHANNEL OCCUPANCY TIME (COT) PERIOD IN UNLICENSED FREQUENCY SPECTRUM

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 475 days.

(21) Appl. No.: 17/430,147

(22) PCT Filed: Feb. 12, 2020

(86) PCT No.: PCT/EP2020/053524
§ 371 (c)(1),
(2) Date: Aug. 11, 2021

(87) PCT Pub. No.: WO2020/165200
PCT Pub. Date: Aug. 20, 2020

(65) Prior Publication Data
US 2022/0104260 A1    Mar. 31, 2022

Related U.S. Application Data

(60) Provisional application No. 62/804,398, filed on Feb. 12, 2019.

(51) Int. Cl.
*H04W 72/0446* (2023.01)
*H04W 16/14* (2009.01)
(Continued)

(52) U.S. Cl.
CPC ....... *H04W 74/0816* (2013.01); *H04W 16/14* (2013.01); *H04W 72/0446* (2013.01);
(Continued)

(58) Field of Classification Search
CPC ............. H04W 74/0816; H04W 16/14; H04W 72/0446; H04W 72/1263; H04W 72/23;
(Continued)

(56) References Cited

U.S. PATENT DOCUMENTS

2008/0165733 A1* 7/2008 Xiao .................... H04W 72/542
455/509
2019/0320452 A1* 10/2019 Zhang ............... H04W 72/0446
(Continued)

OTHER PUBLICATIONS

Panasonic, "COT structure indication," 3GPP TSG-RAN WG1 Ad-Hoc meeting 1901, R1-1900258, Taipei, Taiwan, Jan. 21-25, 2019, pp. 1-3 (Year: 2019).*

(Continued)

*Primary Examiner* — Un C Cho
*Assistant Examiner* — Lalita W Pace
(74) *Attorney, Agent, or Firm* — Sage Patent Group

(57) ABSTRACT

A wireless device (30) is configured for use in a wireless communication system (10). The wireless device (30) monitors for control signaling (28) indicating that the wireless device (30) will be scheduled to transmit or receive within a channel occupancy time, COT, period (20). The wireless device (30) determines, based on whether or not the control signaling (28) is received indicating that the wireless device (30) will be scheduled to transmit or receive within the COT period (20), how often or whether to monitor a dedicated control channel during the COT period (20) for a scheduling grant or assignment indicating scheduling of the wireless device (30) to transmit or receive. The wireless device (30) then monitors or does not monitor the dedicated control channel during the COT period (20) according to that determination.

19 Claims, 18 Drawing Sheets

(51) Int. Cl.
 H04W 72/1263 (2023.01)
 H04W 72/23 (2023.01)
 H04W 74/08 (2024.01)
 H04W 74/0816 (2024.01)

(52) U.S. Cl.
 CPC ....... *H04W 72/1263* (2013.01); *H04W 72/23* (2023.01); *H04W 74/0866* (2013.01)

(58) Field of Classification Search
 CPC ............. H04W 74/0866; H04W 72/20; H04W 74/0808
 See application file for complete search history.

(56) References Cited

U.S. PATENT DOCUMENTS

| | | | |
|---|---|---|---|
| 2020/0053646 A1* | 2/2020 | Kuo | H04W 8/005 |
| 2020/0145972 A1* | 5/2020 | Kwak | H04W 72/23 |
| 2020/0154471 A1* | 5/2020 | Sun | H04W 74/006 |
| 2020/0187250 A1* | 6/2020 | Bhattad | H04W 16/28 |
| 2021/0112536 A1* | 4/2021 | Shah | H04W 74/0808 |
| 2021/0352582 A1* | 11/2021 | Zeng | H04W 74/0816 |

OTHER PUBLICATIONS

Interdigital Inc., "On design of downlink signals and channels for NR-U," 3GPP TSG RAN WG1 AD-Hoc Meeting 1901, R1-1900784, Taipei, Taiwan, Jan. 21-25, 2019 (Year: 2019).*
3GPP, "3rd Generation Partnership Project; Technical Specification Group Radio Access Network; NR; Physical layer procedures for control (Release 15)", 3GPP TS 38.213 V15.4.0, Dec. 2018, 1-104.
3GPP, "3rd Generation Partnership Project; Technical Specification Group Radio Access Network; NR; Physical layer procedures for control (Release 15)", 3GPP TS 38.213 V15.0.0, Dec. 2017, 1-56.
3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.
Ericsson, "DL signals and channels for NR-U", 3GPP TSG-RAN WG1 Meeting Ad Hoc 1901, R1-1900996, Taipei, Taiwan, Jan. 21-25, 2019, 1-8.
Intel Corporation, "Enhancements to configured grants for NR-unlicensed", 3GPP TSG RAN WG1 Meeting AH 1901, R1-1900473, Taipei, Taiwan, Jan. 21-25, 2019, 1-7.
Vivo, "Feature lead summary for Configured grant enhancement", 3GPP TSG RAN WG1 Ad-Hoc Meeting 1901, R1-1901441, Taipei, Jan. 21-25, 2019, 1-12.

* cited by examiner

CONTROL SIGNALLING FOR TRANSMISSION IN A CHANNEL OCCUPANCY TIME (COT) PERIOD IN UNLICENSED FREQUENCY SPECTRUM

TECHNICAL FIELD

The present application relates generally to transmission in unlicensed frequency spectrum, and relates more particularly to control signalling for such a transmission.

BACKGROUND

Before a transmitter is allowed to transmit within a channel occupancy time (COT) period in unlicensed frequency spectrum, the transmitter generally must determine that the spectrum is clear, e.g., based on a channel sensing procedure. However, according to a shared COT approach, after a transmitter controls a COT period by initiating transmission within that COT period, the transmitter may share that COT period with another transmitter, so that the other transmitter does not have to itself perform a channel sensing procedure. This advantageously reduces transmission latency for the other transmitter and/or avoids wasting resources that may have otherwise gone unused.

The shared COT approach nonetheless threatens to consume meaningful amounts of power. Indeed, a device heretofore must periodically monitor for a scheduling grant or assignment throughout a COT period, in order to determine whether the COT period has been shared with the device.

SUMMARY

Some embodiments herein introduce control signalling that enables a wireless device to determine whether or not it will be scheduled to transmit or receive within a channel occupancy time (COT) period and/or whether it should periodically monitor for a scheduling grant or assignment throughout the COT period. The control signalling in some embodiments may even be sent before or at the start of the COT period, so that the wireless device may make this determination in advance of or at the start of the COT period. In this case, then, if the control signalling indicates a wireless device will not be scheduled to transmit or receive within the COT period (i.e., that no scheduling grant or assignment will be sent to the wireless device during the COT period), that wireless device need not periodically monitor for a scheduling grant or assignment throughout the COT period. Instead, the wireless device may exploit the COT period as an opportunity to operate in a sleep state and/or to operate with a discontinuous reception (DRX) cycle longer than it would have absent the control signalling. Accordingly, some embodiments herein generally adapt a wireless device's DRX configuration based on this control signalling, e.g., to conserve device power consumption during the COT period.

Some embodiments herein more particularly include a method performed by a wireless device configured for use in a wireless communication system (e.g., an NR-U system). The method includes monitoring for control signaling indicating that the wireless device will be scheduled to transmit or receive within a channel occupancy time, COT, period. In some embodiments, the method also comprises determining, based on whether or not the control signaling is received indicating that the wireless device will be scheduled to transmit or receive within the COT period, how often or whether to monitor a dedicated control channel during the COT period for a scheduling grant or assignment indicating scheduling of the wireless device to transmit or receive. The method may then include monitoring or not monitoring the dedicated control channel during the COT period according to that determination.

In some embodiments, the method further comprises determining, based on whether or not the control signaling is received indicating that the wireless device will be scheduled to transmit or receive within the COT period, a discontinuous reception, DRX, configuration to apply during the COT period. The method in this case may also comprise applying the determined DRX configuration during the COT period. In one such embodiment, said determining comprises determining whether to apply a short DRX configuration with a relatively short DRX cycle or a long DRX configuration with a relatively long DRX cycle, depending respectively on whether or not control signaling is received indicating that the wireless device will be scheduled to transmit or receive within the COT period, wherein the long DRX cycle is longer than the short DRX cycle.

In some embodiments, the control signaling indicates that the wireless device will be scheduled to transmit or receive during the COT period by indicating that the wireless device is to monitor a dedicated control channel during the COT period for a scheduling grant or assignment.

In some embodiments, said monitoring comprises monitoring for a group-common downlink control channel addressed to a group of wireless devices to which the wireless device belongs. In this case, the method may further comprise determining whether or not the wireless device will be scheduled to transmit or receive within the COT period based respectively on whether or not the wireless device receives a group-common downlink control channel addressed to said group of wireless devices to which the wireless device belongs.

In some embodiments, the control signaling is included in or accompanied by COT information that indicates a slot structure of the COT period. In this case, the method may comprise monitoring for the control signaling during a beginning portion of the COT period and/or in advance of receiving any scheduling assignment or grant for transmitting or receiving within the COT period.

In some embodiments, the control signaling comprises a trivial scheduling grant on a dedicated control channel, wherein the trivial scheduling grant allocates either no radio resources to the wireless device or allocates a minimum allowed number of radio resources to the wireless device.

In some embodiments, the COT period is a period of time for which a transmitter is able to occupy a channel in unlicensed frequency spectrum after having initiated a transmission burst on that channel, wherein the COT period is a shared COT period that the transmitter has shared with one or more other transmitters.

In some embodiments, the method comprises monitoring for the control signaling after receiving other control signaling indicating presence of a downlink or uplink transmission burst on a channel in unlicensed frequency spectrum.

In some embodiments, the control signaling further indicates which one or more services are allowed to be scheduled, are preferred to be scheduled, or will be scheduled within the COT period.

In some embodiments, the method further comprises, based on the wireless device being scheduled to transmit or receive within the COT period, transmitting or receiving within the COT period.

Embodiments herein also include a corresponding method performed by a radio network node configured for use in a wireless communication system (e.g., an NR-U system). The method comprises transmitting control signaling indicating that a wireless device will be scheduled to transmit or receive within a channel occupancy time, COT, period.

In some embodiments, the control signaling indicates which one or more wireless devices will be scheduled to transmit or receive within the COT period.

In some embodiments, the control signaling indicates that the wireless device will be scheduled to transmit or receive during the COT period by indicating whether or not the wireless device is to monitor a dedicated control channel during the COT period for a scheduling grant or assignment.

In some embodiments, the control signaling comprises or is indicated by a group-common downlink control channel, wherein the group-common downlink control channel is addressed to a group of wireless devices that will be scheduled to transmit or receive within the COT period.

In some embodiments, the control signaling is included in or accompanied by COT information that indicates a slot structure of the COT period. In this case, the method may comprise transmitting the control signaling during a beginning portion of the COT period and/or in advance of transmitting any scheduling assignment or grant for transmitting or receiving within the COT period.

In some embodiments, the control signaling comprises a trivial scheduling grant on a dedicated control channel, wherein the trivial scheduling grant allocates either no radio resources to the wireless device or allocates a minimum allowed number of radio resources to the wireless device.

In some embodiments, the COT period is a period of time for which a transmitter is able to occupy a channel in unlicensed frequency spectrum after having initiated a transmission burst on that channel, wherein the COT period is a shared COT period that the transmitter has shared with one or more other transmitters.

In some embodiments, the method comprises transmitting the control signaling after transmitting other control signaling indicating presence of a downlink or uplink transmission burst on a channel in unlicensed frequency spectrum.

In some embodiments, the control signaling further indicates which one or more services are allowed to be scheduled, are preferred to be scheduled, or will be scheduled within the COT period.

In some embodiments, the method further comprises, based on the wireless device being scheduled to transmit or receive within the COT period, transmitting or receiving within the COT period.

Embodiments herein also include corresponding apparatus, computer programs, and carriers of those computer programs. For example, embodiments herein include a wireless device configured for use in a wireless communication system. The wireless device is configured (e.g., via communication circuitry and processing circuitry) to monitor for control signaling indicating that the wireless device will be scheduled to transmit or receive within a channel occupancy time, COT, period. The wireless device may also be configured to determine, based on whether or not the control signaling is received indicating that the wireless device will be scheduled to transmit or receive within the COT period, how often or whether to monitor a dedicated control channel during the COT period for a scheduling grant or assignment indicating scheduling of the wireless device to transmit or receive. The wireless device may be further configured to monitor or not monitor the dedicated control channel during the COT period according to the determination of how often or whether to monitor the dedicated control channel during the COT period.

Embodiments herein moreover include a radio network node configured for use in a wireless communication system. The radio network node is configured to transmit control signaling indicating that a wireless device will be scheduled to transmit or receive within a channel occupancy time, COT, period.

DETAILED DESCRIPTION

Figure 1:
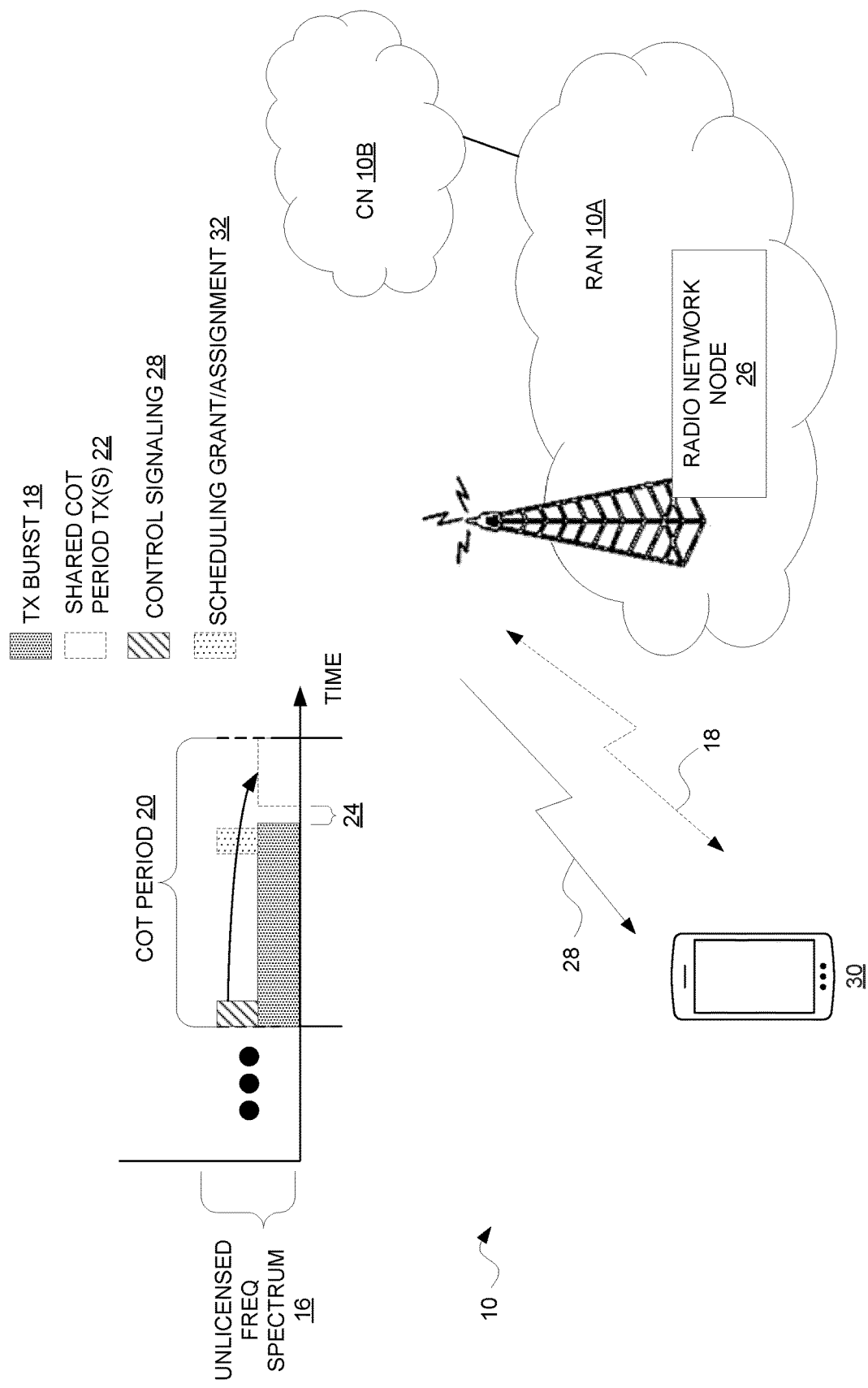
FIG. 1 is a block diagram of a wireless communication system according to some embodiments.

FIG. 1 shows a wireless communication system 10 (e.g., a New Radio Unlicensed, NR-U, system) according to some embodiments. The system 10 as shown includes a radio access network (RAN) 10A that provides radio access to one or more wireless devices and a core network (CN) 10B that interconnects the RAN 10A to one or more other networks (e.g., the Internet).

The RAN 10A is configured to provide radio access at least on unlicensed frequency spectrum 16. Generally, before a transmitter performs a transmission on this unlicensed frequency spectrum 16, the transmitter must determine that the spectrum 16 is clear, e.g., based on a channel sensing procedure such as Listen-Before-Talk (LBT). If the spectrum 16 is clear, the transmitter may transmit a transmission burst within a channel occupancy time (COT) period. FIG. 1 for example shows a transmission (TX) burst 18 transmitted within a COT period 20 on the unlicensed frequency spectrum 16. This transmission burst 18 in some embodiments is a downlink transmission burst, whereas in other embodiments the transmission burst 18 may be an uplink transmission burst.

If the transmission burst 18 does not occupy the full COT period 20, the COT period 20 may be shared so that one or more other transmissions can be performed within the COT period 20, without those transmission(s) being conditioned on performance of a channel sensing procedure. As shown in FIG. 1, for example, after the transmission burst 18 ends, one or more other transmissions 22 may be performed within the COT period 20 (without prerequisite channel sensing) provided that the transmission(s) 22 start within a maximum allowed delay 24 after the transmission burst 18 ends. This advantageously reduces transmission latency for the other transmission(s) 22 and/or avoids wasting resources that may have otherwise gone unused.

Notably, according to some embodiments herein, a radio network node 26 (e.g., the same radio network node that transmits or receives the transmission burst 18 in COT period 20) is configured to transmit control signalling 28. A wireless device 30 is correspondingly configured to monitor for and/or receive this control signalling 28. In some embodiments as shown, the radio network node 26 transmits, and the wireless device 30 monitors for and/or receives, the control signalling 26 during a beginning portion of the COT period 20.

In some embodiments, the control signalling 28 indicates (e.g., directly or indirectly to the wireless device 30) whether or not the wireless device 30 will be scheduled to transmit or receive within the COT period 20, e.g., whether or not the wireless device 30 will be scheduled to transmit or receive a transmission 22 after the transmission burst 18 in the COT period 20. If the wireless device 30 will be scheduled to transmit or receive within the COT period 20, that means that a scheduling grant or assignment 32 (e.g., in the form of downlink control information, DCI) will at some point later be transmitted to the wireless device 30 (within COT period 20), e.g., in order to indicate the radio resource(s) granted/assigned to the wireless device 30 for transmitting or receiving a transmission 22. The control signalling 28 in this case may thereby effectively indicate, in advance, whether or not the wireless device 30 should monitor for and/or expect to receive a scheduling grant or assignment 32 later on during the COT period 20 (as shown in FIG. 1). Correspondingly, in alternative formulations of control signalling 28, the control signalling 28 may expressly indicate whether or not the wireless device 30 should or is to monitor (a dedicated control channel, such as PDCCH) during the COT period 20 for a scheduling grant or assignment 32.

Note that the control signalling 28 in some embodiments may be selectively transmitted to the wireless device 26 only if the wireless device 30 will be scheduled to transmit or receive during the COT period 20. The absence of such control signalling 28 may thereby implicitly indicate to the wireless device 30 that the wireless device 30 will not be scheduled to transmit or receive during the COT period 20. Accordingly, in some embodiments, the control signalling 28 (when actually transmitted) indicates that the wireless device 30 will be scheduled to transmit or receive during the COT period 20.

In some embodiments, the control signalling 28 is transmitted in a dedicated manner to the wireless device 30. The control signalling 28 for example may comprise or be indicated by a dedicated control channel, such as a PDCCH.

In other embodiments, though, the control signalling 28 is transmitted on a multicast or broadcast manner. The control signalling 28 for example may comprise or be indicated by a group-common control channel, such as a group common PDCCH (GC-PDCCH). Especially in these latter embodiments, then, the control signalling 28 may not only indicate whether or not the wireless device 30 will be scheduled within the COT period 20 but may also indicate whether or not one or more other wireless devices will be scheduled within the COT period 20.

The control signalling 28 in some embodiments may do so by indicating which one or more wireless devices (if any) will be scheduled to transmit or receive within the COT period 20. For example, the control signalling 28 may indicate one or more identifiers of such wireless device(s). Or, the control signalling 28 may do so by indicating a group of one or more wireless devices that will be scheduled within he COT period 20. In these and other embodiments, the control signalling 28 may be included in or accompanied by COT information, e.g., that indicates a slot structure of the COT period 20. Alternatively or additionally, in embodiments where the control signalling 28 comprises or is indicated by a group-common control channel (e.g., GC-PDCCH), the group-common control channel may be addressed (e.g., using a radio network temporary identifier, RNTI) to a group of one or more wireless devices that will be scheduled to transmit or receive within the COT period 20.

No matter the particular nature of the control signalling 28, if the control signalling 28 indicates the wireless device 30 will not be scheduled to transmit or receive within the COT period 20 (i.e., that no scheduling grant or assignment 32 will be sent to the wireless device 30 during the COT period 20), the wireless device 30 may refrain from periodically monitoring for such a scheduling grant or assignment 32 during the COT period 20, at all or with a reduced periodicity. Instead, the wireless device 30 may exploit the COT period 20 as an opportunity to operate in a sleep state and/or to operate with a discontinuous reception (DRX) cycle longer than it would have absent the control signalling 28. Accordingly, the wireless device 30 according to some embodiments herein generally adapt its DRX configuration based on this control signalling 28, e.g., to conserve device power consumption during the COT period 20.

For example, in some embodiments, the wireless device 30 determines, based on whether or not the wireless device 30 will be scheduled to transmit or receive within the COT period 20, a discontinuous reception, DRX, configuration to apply during the COT period 20. This may entail for instance determining whether to apply a short DRX configuration with a relatively short DRX cycle or a long DRX configuration with a relatively long DRX cycle, depending respectively on whether or not the wireless device 30 will be scheduled to transmit or receive within the COT period 20 (where here the long DRX cycle is longer than the short DRX cycle). The wireless device 30 may then apply the determined DRX configuration during the COT period 20.

Alternatively or additionally, the wireless device 30 may determine, based on whether or not the wireless device 30 will be scheduled to transmit or receive within the COT period 20, how often or whether to monitor a dedicated control channel during the COT period 20 for a scheduling grant or assignment 32 indicating scheduling of the wireless device 30 to transmit or receive. The wireless device 30 may then monitor (or not monitor) the dedicated control channel according to that determination.

Note that in some embodiments the control signalling 28 alternatively or additionally indicates which one or more services are allowed to be scheduled, are preferred to be scheduled, or will be scheduled within the COT period 20. For example, the control signaling 28 may indicate the one or more services by indicating one or more logical channel identifiers, one or more logical channel group identifiers, one or more logical channel priority indicators, or one or more channel access priority classes. The wireless device 30 according to some embodiments then may determine its DRX configuration additionally or alternatively based on the one or more services indicated.

Figure 2:
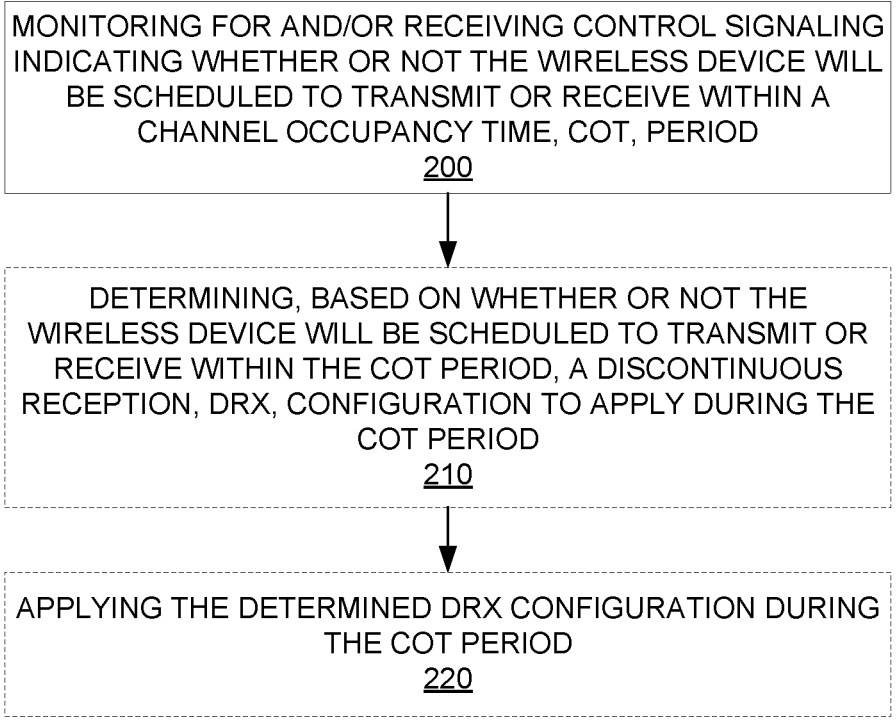
FIG. 2 is a logic flow diagram of a method performed by a wireless device according to some embodiments.

In view of the above modifications and variations, FIG. 2 depicts a method performed by a wireless device 30 configured for use in a wireless communication system 10 in accordance with particular embodiments. The method includes monitoring for and/or receiving control signaling 28 indicating whether or not the wireless device 30 will be scheduled to transmit or receive within a channel occupancy time, COT, period 20 (Block 200). In some embodiments, then, the control signaling 28 indicates that the wireless device 30 will be scheduled to transmit or receive within the COT period 20. Regardless, in some embodiments, the method may also include determining, based on whether or not the wireless device 30 will be scheduled to transmit or receive within the COT period 20, a discontinuous reception, DRX, configuration to apply during the COT period 20 (Block 210). The method may then include applying the determined DRX configuration during the COT period 20 (Block 220).

Figure 3:
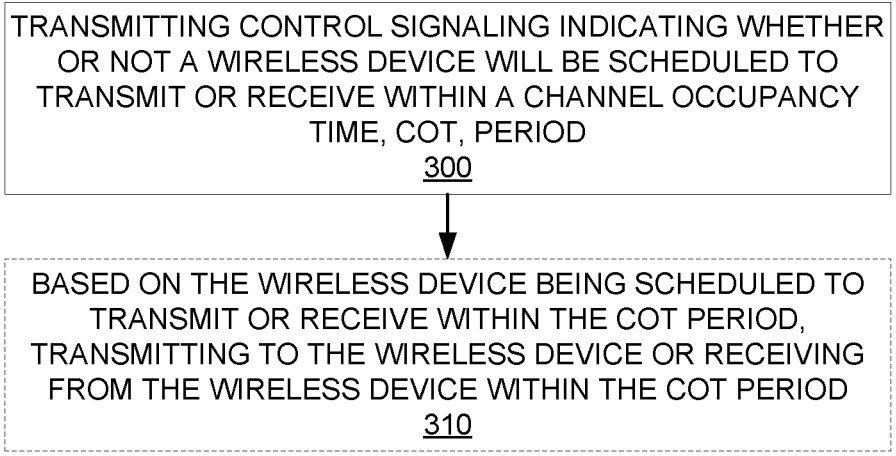
FIG. 3 is a logic flow diagram of a method performed by a radio network node according to some embodiments.

FIG. 3 depicts a method performed by a radio network node 26 configured for use in a wireless communication system 10 in accordance with other particular embodiments. The method includes transmitting control signaling 28 indicating whether or not a wireless device 30 will be scheduled to transmit or receive within a channel occupancy time, COT, period 20 (Block 300). In some embodiments, then, the control signaling 28 indicates that the wireless device 30 will be scheduled to transmit or receive within the COT period 20. Regardless, the method in some embodiments also includes, based on the wireless device 30 being scheduled to transmit or receive within the COT period 20, transmitting to the wireless device 30 or receiving from the wireless device 30 within the COT period 20 (Block 310).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
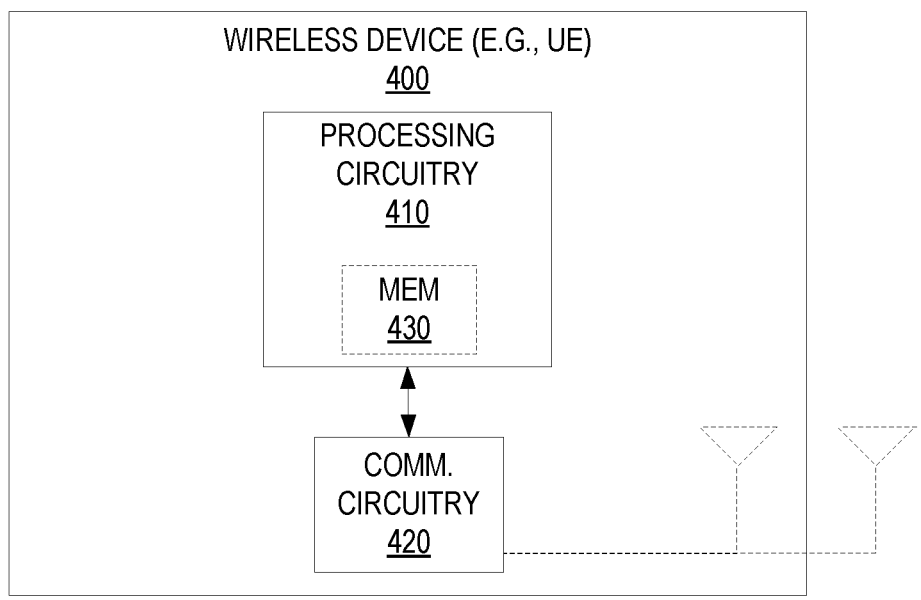
FIG. 4 is a block diagram of a wireless device according to some embodiments.

FIG. 4 for example illustrates a wireless device 400 (e.g., wireless device 30) as implemented in accordance with one or more embodiments. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above, e.g., in FIG. 2, such as by executing instructions stored in memory 430. The processing circuitry 410 in this regard may implement certain functional means, units, or modules.

Figure 5:
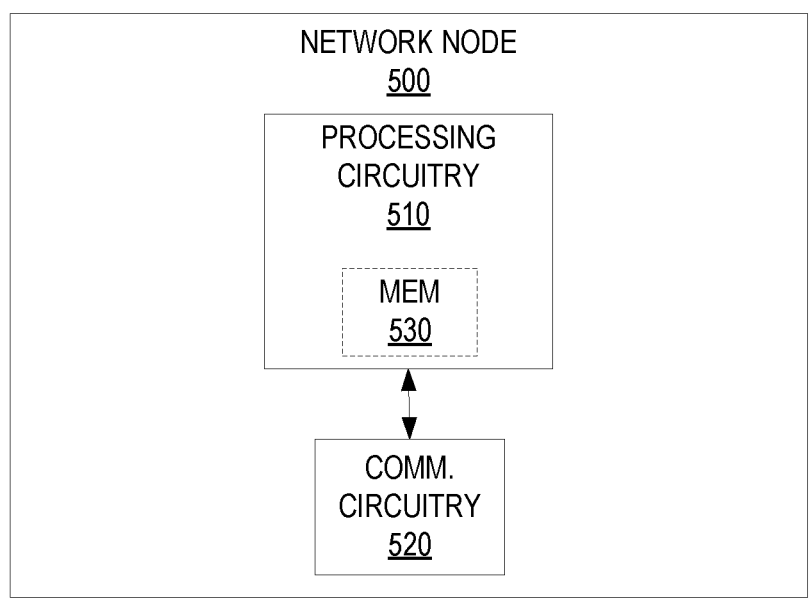
FIG. 5 is a block diagram of a radio network node according to some embodiments.

FIG. 5 illustrates a network node 500 (e.g., radio network node 26) as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 3, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts (e.g., NR-U) and/or wireless network types for illustrative purposes, but the embodiments are similarly applicable in other contexts and/or wireless network types not explicitly described.

Next generation systems are expected to support a wide range of use cases with varying requirements ranging from fully mobile devices to stationary Internet of Things (IoT) or fixed wireless broadband devices. The traffic pattern associated with many use cases is expected to consist of short or long bursts of data traffic with varying length of waiting period in between (here called inactive state). In New Radio (NR), both license assisted access and standalone unlicensed operation are to be supported in 3GPP. Hence the procedure of Physical Random Access Channel (PRACH) transmission and/or Scheduling Request (SR) transmission in unlicensed spectrum shall be investigated in 3GPP. In the following, NR Unlicensed (NR-U) and channel access procedure for a unlicensed channel based on Listen-Before-Talk (LBT) is introduced.

NR-U Introduction

In order to tackle with the ever increasing data demand, NR is considered for both licensed and unlicensed spectrum. NR-U needs to support dual connectivity (DC) and standalone scenarios, where the Medium Access Control (MAC) procedures including the Random Access Channel (RACH) and scheduling procedure on unlicensed spectrum are subject to the LBT failures. There was no such restriction in Long Term Evolution (LTE) Licensed-Assisted Access (LAA), since there was licensed spectrum in LAA scenario so the RACH and scheduling related signaling can be transmitted on the licensed spectrum instead of unlicensed spectrum.

For NR-U, channel sensing should be applied to determine the channel available before a physical signal is transmitted using the channel. This is the case for discovery reference signal (DRS) transmission such as Primary Synchronization Signal (PSS), Secondary Synchronization Signal (SSS), Physical Broadcast Channel (PBCH), and Channel State Information Reference Signal (CSI-RS), control channel transmission such as Physical Uplink Control Channel (PUCCH) and Physical Downlink Control Channel (PDCCH), physical data channel such as Physical Uplink Shared Channel (PUSCH) and Physical Downlink Shared Channel (PDSCH), and uplink sounding reference signal (SRS) such as SRS transmission.

The radio resource management (RRM) procedures in NR-U would be generally rather similar as in LAA, since NR-U is aiming to reuse LAA/eLAA/feLAA technologies as much as possible to handle the coexistence between NR-U and other legacy radio access technologies (RATs). RRM measurements and reporting comprise a special configuration procedure with respect the channel sensing and channel availability.

Hence, channel access/selection for LAA was one of the important aspects for co-existence with other RATs such as Wi-Fi. For instance, LAA has aimed to use carriers that are congested with Wi-Fi.

In licensed spectrum, the UE measures Reference Signal Received Power (RSRP), and Reference Signal Received Quality (RSRQ) of the downlink radio channel, and provides the measurement reports to its serving eNB/gNB. However, they don't reflect the interference strength on the carrier. Another metric Received Signal Strength Indicator (RSSI) can serve for such purpose. At the eNB/gNB side, it is possible to derive RSSI based on the received RSRP and RSRQ reports. However, this requires that they must be available. Due to the LBT failure, some reports in terms of RSRP or RSRP may be blocked. This can be due to that either the reference signal transmission (DRS) is blocked in the downlink or the measurement report is blocked in the uplink. Hence, the measurements in terms of RSSI are very useful. The RSSI measurements, together with the time information concerning when and how long of time UEs have made the measurements, can assist the gNB/eNB to detect the hidden node. Additionally, the gNB/eNB can measure the load situation of the carrier which is useful for the network to prioritize some channels for load balance and channel access failure avoidance purposes.

LTE LAA has defined to support measurements of averaged RSSI and channel occupancy) for measurement reports. The channel occupancy is defined as the percentage of time that RSSI was measured above a configured threshold. For this purpose, an RSSI measurement timing configuration (RMTC) includes a measurement duration (e.g. 1-5 ms) and a period between measurements (e.g. {40, 80, 160, 320, 640} ms).

Channel Access Procedure in NR Unlicensed Spectrum

Listen-before-talk (LBT) is designed for unlicensed spectrum co-existence with other radio access technologies (RATs). In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before its next CCA attempt. In order to protect the ACK transmissions, the transmitter must defer a period after each busy CCA slot prior to resuming back-off. As soon as the transmitter has grasped access to a channel, the transmitter is only allowed to perform transmission for up to a maximum time duration (namely, the maximum channel occupancy time (MCOT)). For QoS differentiation, a channel access priority based on the service type has been defined. For example, four LBT priority classes are defined for differentiation of contention window sizes (CWS) and MCOT between services.

COT Sharing in NR-U

For a node (e.g., NR-U gNB/UE, LTE-LAA eNB/UE, or Wi-Fi access point (AP)/station (STA)) to be allowed to transmit in unlicensed spectrum (e.g., 5 GHz band) it typically needs to perform a clear channel assessment (CCA). This procedure typically includes sensing the medium to be idle for a number of time intervals. Sensing the medium to be idle can be done in different ways, e.g. using energy detection, preamble detection or using virtual carrier sensing, where the latter implies that the node reads control information from other transmitting nodes informing when a transmission ends. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT (Channel Occupancy Time).

In Wi-Fi, feedback of data reception acknowledgements (ACKs) is transmitted without performing clear channel assessment. Preceding feedback transmission, a small time duration (called SIFS) is introduced between the data transmission and the corresponding feedback which does not include actual sensing of the channel. In 802.11, the SIFS period (16 μs for 5 GHz OFDM PHYs) is defined as:

aSIFSTime=aRxPHYDelay+aMACProcessingDelay+ aRxTxTurnaroundTime aRxPHYDelay defines the duration needed by the PHY layer to deliver a packet to the MAC layer aMACProcessingDelay defines the duration that the MAC layer needs to trigger the PHY layer transmitting a response aRxTxTurnaroundTime defines the duration needed to turn the radio from reception into transmit mode Therefore, the SIFS duration is used to accommodate for the hardware delay to switch the direction from reception to transmission.

It is anticipated that for NR in unlicensed bands (NR-U), a similar gap to accommodate for the radio turnaround time will be allowed. For example, this will enable the transmission of PUCCH carrying uplink control information (UCI) feedback as well as PUSCH carrying data and possible UCI within the same transmit opportunity (TXOP) acquired by the initiating gNB without the UE performing clear channel assessment before PUSCH/PUCCH transmission, as long as the gap between DL and UL transmission is less than or equal to a threshold time (e.g., 16 us). Operation in this manner is typically called "COT sharing."

Figure 6:
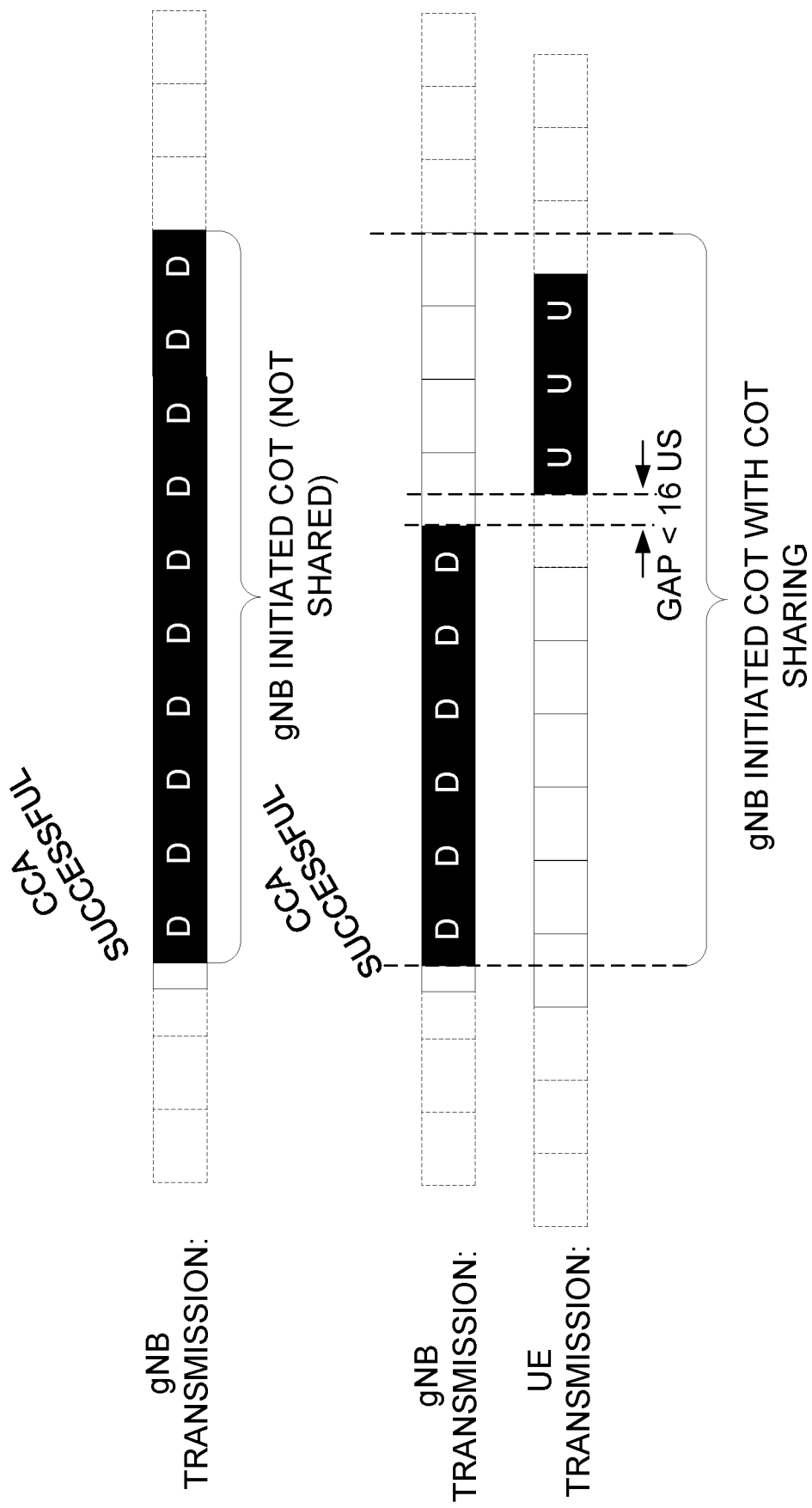
FIG. 6 is a block diagram of an example of transmission opportunities (TXOP) both with and without COT sharing where CCA is performed by the initiating node.

FIG. 6 shows an example of transmission opportunities (TXOP) both with and without COT sharing where CCA is performed by the initiating node (gNB). For the case of COT sharing the gap between DL and UL transmission is less than 16 us.

There currently exist certain challenge(s). In an unlicensed system, data transmission interruption and latency may be incurred due to LBT operations, which may lead to service quality of service (QoS) degradation for a UE. Therefore, a COT sharing mechanism may be beneficial to reduce unnecessary LBT operations for NR-U. However, it is important that the gap between two consecutive transmission bursts must be less than a given time period in order to share a COT. For example, as described in the TR 38.889 V 16.0.0, Within a gNB-initiated COT, an UL burst for a UE consisting of one or more of PUSCH, PUCCH, PRACH, and SRS follows the channel access schemes in the following table.

Channel Access Schemes for a UL Burst within a gNB-Initiated COT as LBE Device

| Cat 1 Immediate transmission | Cat 2 LBT | Cat 4 LBT |
|---|---|---|
| When the gap from the end of the DL transmission to the beginning of the UL burst is not more than 16 msec. Note: Maximum limits of the duration of the UL burst other than those already derived from MCOT duration limits should be further discussed when specifications are developed. | For any of the following cases: When the gap between any two successive scheduled/granted transmissions in the COT is not greater than 25 msec For the case where a UL transmission in the gNB initiated COT is not followed by a DL transmission in the same COT Note: the duration from the start of the first transmission within the channel occupancy until the end of the last transmission in the same channel occupancy shall not exceed 20 ms. | N/A |

Note:
An UL burst is defined as a set of transmissions from a given UE having no gaps or gaps of no more than 16 μs. Transmissions from a UE having a gap of more than 16 μs are considered as separate UL bursts. The number of LBT attempts within a COT should be determined when specifications are developed.

Based on the above description, in order for a UE to perform an uplink transmission immediately within a gNB initiated COT, the gap between the beginning of UL data burst and the end of DL burst must be shorter than 16 us.

In some embodiments, detection of a DL transmission burst involves the following. The UE may assume the presence of a signal, such as the DMRS in any [PDCCH or GC-PDCCH] transmission, to detect transmission bursts by the serving gNB, to enable power saving by not necessitating performing blind decodes to detect the transmission burst (Note: The power saving possibility by not necessitating blind decodes assumes performance relaxation for PDCCH decoding is not needed. Also, this does not mandate a two-step PDCCH decoding process for the UE with respect to DMRS detection). The payload of a PDCCH and/or GC-PDCCH transmission can contain information regarding COT structure that may be used by the UE for power saving.

From the above, some embodiments herein recognize one or more aspects for enhancing the UE power saving. In one aspect, the design of a shared COT concept is to allow a transmitter (either a UE or a gNB) to initiate a transmission without the UE performing clear channel assessment before transmission as long as the gap between two adjacent transmissions is less than or equal to 16 us. For UEs in a shared COT, the UE needs to monitor PDCCHs more often to prepare any potential transmission or reception. Notably, then, for UEs that are not in a shared COT, those UEs according to some embodiments herein do not need to monitor PDCCHs as they ordinarily would.

In a second aspect, with a signal such as the DMRS carried by a PDCCH or GC-PDCCH, the UE can detect if there is a DL transmission burst from the gNB. If there is a DL transmission burst presented, a UE shall monitor PDCCH for potential DL data reception. According to some embodiments, then, if there is not a DL transmission burst presented, the UE does not need to monitor PDCCH as it ordinarily would.

Some embodiments herein therefore include a method on how to adapt DRX configuration for a UE with knowledge of COT information.

According to some embodiments, for example, a UE adapts its DRX configuration based on monitoring 1) a wideband signal indicating presence of a data burst/COT (either gNB or UE initiated); and/or 2) a UE dedicated PDCCH within its own USS for a configured time period at the start of a COT (for example, X OFDM symbols). This UE-dedicated PDCCH within the UE's USS may be an example of control signaling 28 in FIG. 1.

Alternatively or additionally, the COT structure/information in some embodiments is extended to indicate UE IDs that are or will be scheduled within the COT. This extension to indicate UE IDs may be another example of control signaling 28 in FIG. 1. This means that the gNB may pre-determine what UEs to be scheduled within this planned COT period. In this way, the gNB may lose scheduling flexibility to a certain extent. However, such information can assist UEs to enhance DRX configuration to gain UE power saving.

Alternatively or additionally, the COT structure/information in some embodiments is extended to indicate services that are allowed to be scheduled within the COT. This extension to indicate services may be yet another example of control signaling 28 in FIG. 1. The services may be associated with different logical channel (LCH) identities, LCH group identities (LCG) IDs, LCH priority indicator(s), or channel access priority classes (CAPC). Therefore, it is sufficient in some embodiments that the COT structure can indicate these IDs.

Certain embodiments may provide one or more of the following technical advantage(s). According to some embodiments, a UE advantageously adapts its DRX configuration for best power saving with knowledge of the COT information. Alternatively or additionally, the COT information in some embodiments is extended to carry/indicate additional information, to achieve a good balance between QoS satisfaction and UE power saving.

Consider additional details of some embodiments. The below embodiments are described in the context of NR unlicensed spectrum (NR-U). But embodiments herein are not limited to NR-U scenarios. They are also applicable to other unlicensed operation scenarios such as LTE LAA/eLAA/feLAA.

Some embodiments herein enhance UE power savings, based on the UE reducing its PDCCH monitoring. The UE may do so based on its reception of the control signaling 28 herein, e.g., in the form of COT information as extended as described herein. For example, in some embodiments the effective COT information indicates If a UE is expected to be involved in any data activity i.e., data transmission or reception in the COT. Therefore, the UE may use this effective COT information to boost power saving for the UE to reduce PDCCH monitoring.

Extended COT Information

In some embodiments, gNB initiated COT information is transmitted to the UE(s) regarding COT structure and one or more of: DL/UL/flexible symbols (like SFI), PDCCH monitoring indicator (e.g., indicate the PDCCH monitoring pattern such as how often to monitor PDCCH, PDCCH monitoring is mini-slot based or ordinary slot based), SFI information (start/end/next), Occupied bandwidth, COT Duration, End of COT, Additional SFI entries for partial slots, SFI of outside COT, and COT Sharing (e.g. for configured grant sharing). In some embodiments, for COT sharing related with NRU configured grant, UE-initialed COT sharing with gNB may be supported at least for transmitting DL signals (PDSCH, PDCCH, reference signals) intending for the UE.

Consider now possible further enhancements to COT structure, e.g., in the form of control signaling 28. In some embodiments, the COT structure shall be further enhanced (e.g., to convey control signaling 28) to carry/indicate additional new information such as:

1) UE IDs that are or will be scheduled within the COT. This means that the gNB may pre-determine what UEs to be scheduled within this planned COT period. In this way, the gNB may lose scheduling flexibility to a certain extent. However, such information can assist UEs to enhance DRX configuration to gain UE power saving.

2) Services are allowed to be scheduled within the COT. The services may be associated with different Logical Channel (LCH) ID/Logical Channel Group (LCG) ID or LCH priority indicator, or Channel Access Priority Class (CAPC). Therefore, it is sufficient that the COT structure can indicate these IDs.

For aspect 1, consider several embodiments on how to signal UE IDs that are to be scheduled with the COT. In one embodiment, a UE may be configured with one or multiple group RNTIs. Each RNTI may be associated with a specific service. Reception of a wideband signal such as GC-PDCCH addressed to a specific group RNTI, can indicate that the group of UEs (e.g., associated with a specific service) is to be scheduled in the COT. In a second embodiment, the UE IDs are explicitly signaled via group signaling which is transmitted (e.g., in a broadcast manner) such as using downlink control information (DCI) (e.g., on GC-PDCCH) or a MAC CE, or RRC signaling. The information/signaling on UE IDs may be carried within the COT information or in separate/subsequent signaling after COT information signaling. In a third embodiment, the gNB may send a DCI signaling (e.g., addressed to UE's C-RNTI or CS-RNTI) to a UE with a zero grant or a very small grant at a start period of a COT (for example, a configured period spanning X OFDM symbols in the time domain), to indicate that this UE will be scheduled within the COT period.

DRX Activity Periods with Knowledge of COT Information

Figure 7:
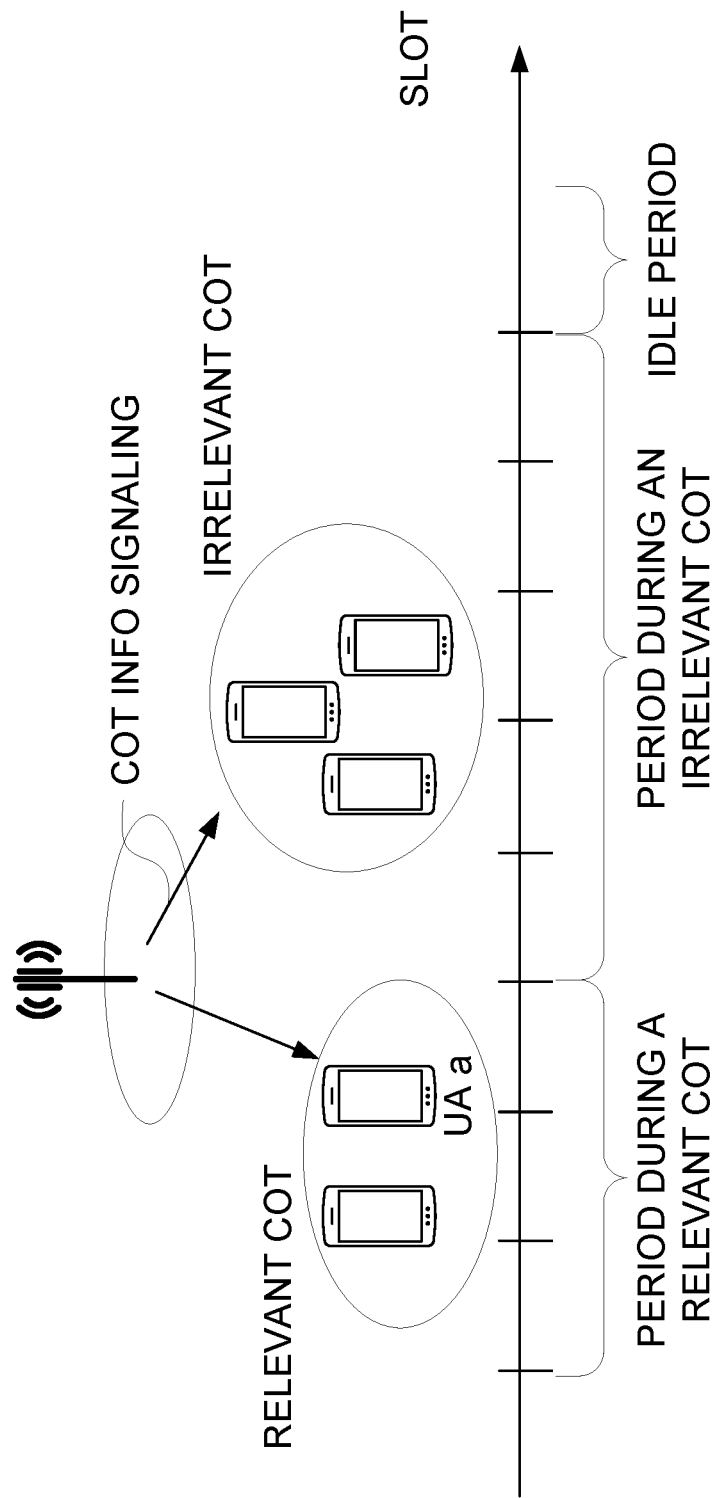
FIG. 7 is a block diagram of an example of different DRX activity periods with knowledge of COT information according to some embodiments.

FIG. 7 shows an example of different DRX activity periods with knowledge of COT information.

For a UE with DRX capability, its DRX activity of PDCCH monitoring can be classified into three different activity periods with knowledge of the COT information. These different DRX activity periods include:

1) Relevant COT periods, during which the UE is scheduled for data transmission or reception
2) Irrelevant COT periods, during which the UE is not scheduled for any data transmission or reception
3) Idle periods during which there is not any data transmission or reception from any UE.

Method to Determine DRX Activity Period

In some embodiments, the UE may assume the presence of a signal, such as the DMRS in any [PDCCH or GC-PDCCH] transmission, to detect transmission bursts by the serving gNB. In this case, then, NR-U will support a mechanism that a gNB can send a signal in DL such as the DMRS in GC-PDCCH transmission to indicate the presence of a DL transmission burst. The signaling may be transmitted in a broadcast manner carrying information on the COT structure. It is assumed that the UE may be configured with a CORESET containing a common search space (CSS) in which a GC-PDCCH may be transmitted. Such a signal in some embodiments shall be further extended to also indicate the presence of an UL transmission burst initiated by one or multiple UEs. Indeed, as far as the gNB plans to schedule a couple of UEs for UL transmission within a given period, the gNB can start to transmit the signal (e.g., such as the DMRS in any [PDCCH or GC-PDCCH]) to signal all UEs on the presence of an UL burst.

Some embodiments are proposed below for a UE to determine itself in which DRX activity period it is in.

For idle periods, the UE can just monitor the signal, such as the DMRS in any [PDCCH or GC-PDCCH] transmission. If the signal is present, the UE can determine that the UE is not in idle periods. Otherwise, the UE is in an idle period.

In some embodiments, the UE shall periodically monitor the signal for detection of UL/DL transmission burst purpose. If the signal is detected, the UE can determine itself is in either a relevant COT period, or an irrelevant COT period. The UE can be configured to further monitor PDCCH in a UE dedicated PDCCH search space for a configured time period, e.g., X OFDM symbols. This is the third option that has been described above. During this configured period, if the UE can receive a DCI addressed to its own UE ID, such as its C-RNTI, or CS-RNTI, the UE can determine that itself will be scheduled in this COT. Therefore this COT is a relevant COT for it. Otherwise, this COT would be irrelevant to this UE. The gNB may not be able to schedule all planned UEs during a configured period at the start of a COT due to limited system resources. In this case, the gNB may send a DCI signaling to a UE with a zero grant or a very small grant, to indicate that this UE will be scheduled within the COT period.

Figure 8:
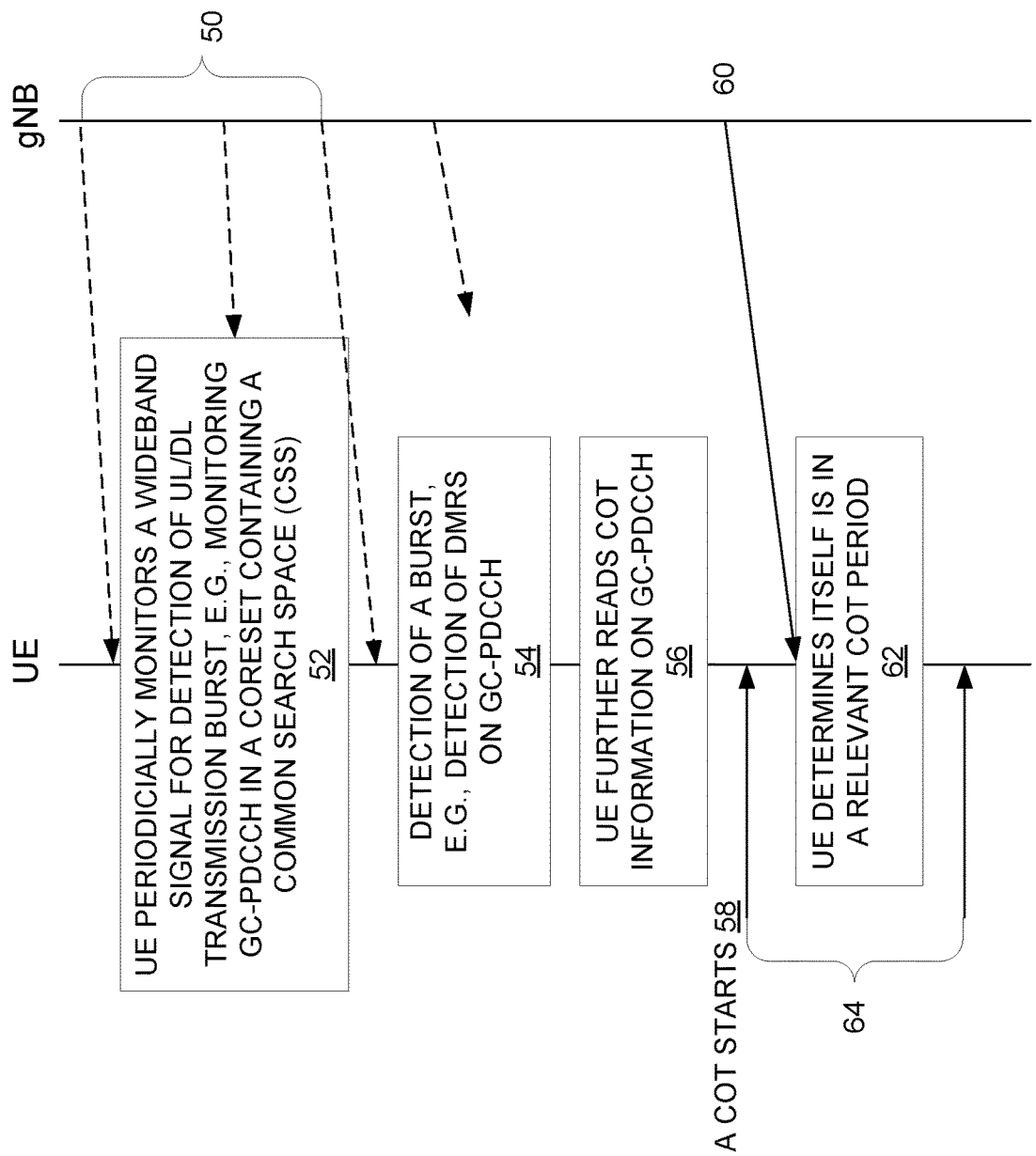
FIG. 8 is a block diagram of an example on how a UE is to determine if a COT is relevant to itself, according to some embodiments.

FIG. 8 shows an example on how a UE is to determine if a COT is relevant to itself. As shown, in step 50, the gNB performs a transmission of a wideband signal for indicating the presence of a data burst, e.g., GC-PDCCH. In step 52, the UE periodically monitors a wideband signal for detection of uplink (UL)/downlink (DL) transmission burst, e.g., monitoring GC-PDCCH in a CORESET containing a common search space (CSS). In step 54, the UE performs detects a burst, e.g., detection of DMRS on GC-PDCCH. In step 56, the UE further reads COT information on GC-PDCCH. At or after start of the COT (step 58), the gNB at step 60 transmits a DCI (e.g., addressed to the UE's C-RNTI/CS-RNTI) indicating that the UE will be scheduled within the COT. The DCI may carry a zero grant. In step 62, the UE determines itself to be in a relevant COT period. In step 64, the UE monitors its dedicated PDCCH in a PDCCH user specific search space (USS) within X OFDM symbols.

Embodiments on Adaptive DRX Based on COT Structure/Information

As one embodiment, a UE is in an idle period meaning that there is not any transmission burst detected. The UE can apply a DRX configuration set mainly for power saving purpose, such as, it contains only a long DRX cycle. The timer settings for the UE to keep in active in the DRX cycle is configured in line with the periodicity or interval during which the gNB may transmit a wideband signal to indicate the presence of a COT period. In this way, the UE can keep itself as inactive in most of the time in idle periods.

As one embodiment, a UE is in a relevant COT period, meaning that the UE has been signaled that the UE is being or is to be scheduled within the COT period. The UE is configured to adapt its DRX configuration which is suitable for a more frequent PDCCH monitoring. For example, the DRX configuration may contain short DRX cycles. The DRX configuration may be set/adapted with knowledge of the service QoS, which may be signaled in the COT information. Within this relevant COT period, the UE may be configured to apply a different DRX configuration at the start period of the COT (e.g., within a configured X OFDM symbols). Within this period, the UE monitors for example PDCCH in a PDCCH USS to detect if it is going to be scheduled within the COT. The DRX configuration for this period is suitable to provide an intermediate level of PDCCH monitoring activities.

As one embodiment, a UE is in an irrelevant COT period, meaning that the UE has detected the presence of a COT. However, the UE is not to be scheduled within the COT. The UE is configured to adapt its DRX configuration which is mainly suitable for power saving purpose, i.e., with infrequent PDCCH monitoring. For example, the DRX configuration may contain only long DRX cycles. In an extreme case, the UE can just keep itself fully inactive until expiration of the COT period. Within this irrelevant COT period, the UE may be configured to apply a different DRX configuration at the start period of the COT (e.g., within a configured X OFDM symbols). Within this period, the UE monitors for example PDCCH in a PDCCH USS to detect if it is going to be scheduled within the COT. The DRX configuration for this period is suitable to provide an intermediate level of PDCCH monitoring activities.

Figure 9:
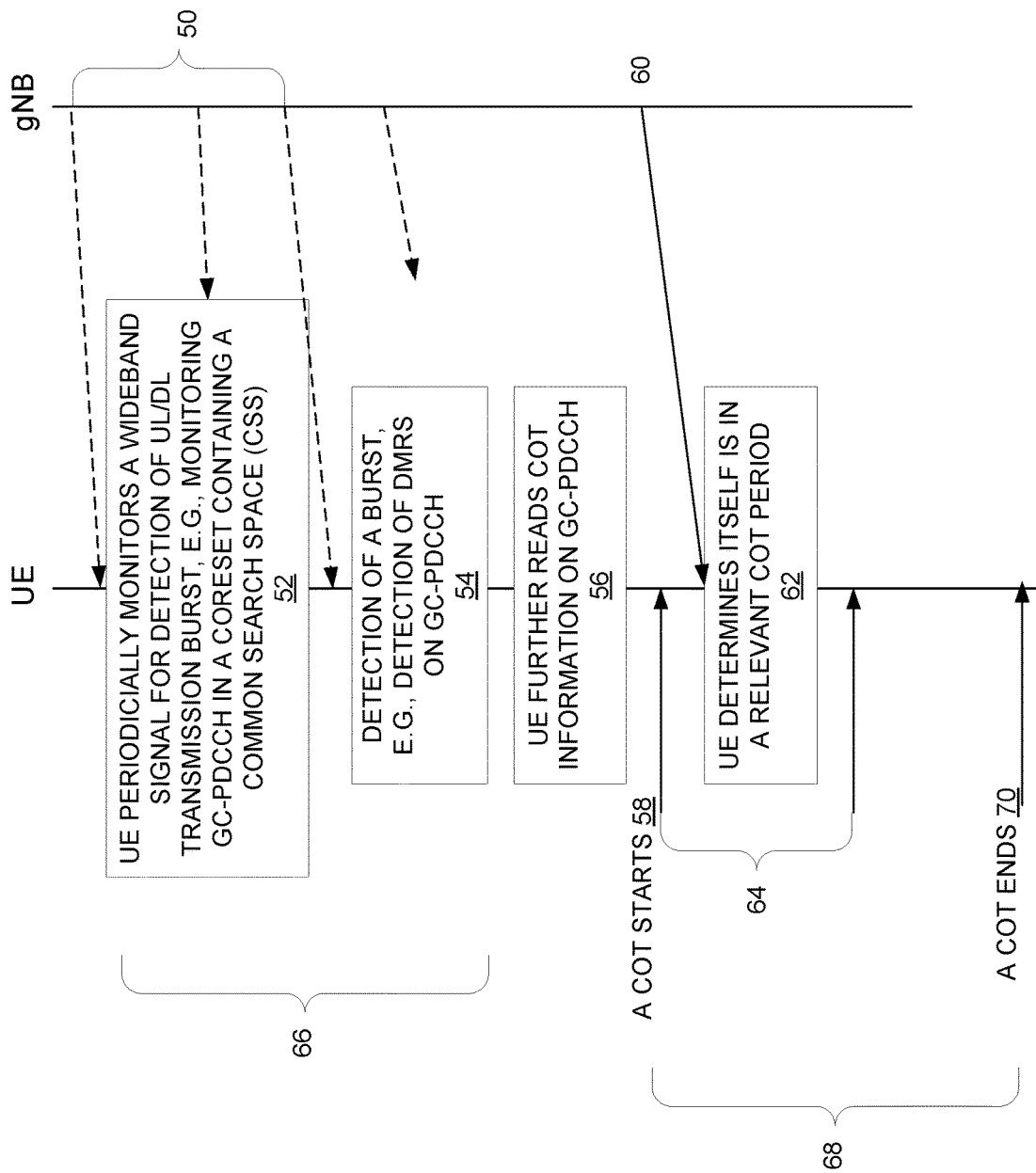
FIG. 9 is a block diagram showing adaptive DRX configuration according to some embodiments.

An example on how to adaptive DRX configuration is illustrated in FIG. 9. Steps 50 through 64 are as described with respect to FIG. 8. In step 66, the UE applies a DRX configuration to only monitor the wideband signal, such as GC-PDCCH. In step 68, the UE performs PDCCH monitoring at an intermediate level within X OFDM symbols. After that, the UE applies a more frequency PDCCH monitoring, since it is in a relevant COT period. Otherwise, the UE may turn itself fully inactive within the rest of the COT if the COT is irrelevant to the UE.

Some embodiments herein are included in the following context. Detection of the DMRS of the GC-PDCCH is well-suited for the purposes of gNB DL transmission burst detection, thus providing a mechanism for managing UE power consumption. With this approach, a UE can first detect that there is a gNB DL transmission starting in a particular slot before starting blind PDCCH decoding to determine if it is scheduled. This 2-step approach may be an implementation choice for the UE. The baseline PDSCH scheduling mechanism in NR Rel-15 works just fine for a UE to determine if and when it is scheduled based on blind PDCCH decoding.

In some embodiments, it is assumed that the UE is configured with a CORESET containing a common search space (CSS) in which a GC-PDCCH may be transmitted in a broadcast manner carrying information on the COT structure (slot format), e.g., based on a potentially enhanced DCI Format 2_0. Within this CORESET, the UE is also configured with a UE specific search space (USS) in which a PDCCH may be transmitted carrying dedicated grants scheduling UL and/or DL transmissions to specific users. Within the CORESET, the UE is configured with a wideband DMRS that is known to all users for the purposes of DL Tx identification and (GC)-PDCCH demodulation/decoding. In general, other configurations supported in Rel-15 NR are possible, e.g., multiple CORESETs, non-wideband DMRS, etc.

In some embodiments, once the wideband DMRS is detected it starts decoding GC-PDCCH to obtain COT structure information. At this point, the UE also starts blind decoding of PDCCH to obtain potential DL/UL scheduling grants. In this way, wideband DMRS detection serves as a low complexity method for the UE to identify when a gNB DL transmission burst starts. Frequent monitoring of both GC-PDCCH and PDCCH occurs up until the first slot boundary in the COT (end of Phase 1). During Phase 1, typically Type B PDSCH mapping (mini-slot scheduling) is used to facilitate fine channel access granularity. In Phase 2, the UE attempts decoding of both GC-PDCCH and PDCCH with reduced frequency, e.g., once per slot, since after the first slot boundary, Type A PDSCH mapping (slot-based) can be used. Such reduced frequency PDCCH monitoring itself offers another power saving opportunity to the UE on top of that offered by C-DRX. Furthermore, depending on whether or not a UE has received an UL/DL scheduling grant within a COT, there may be additional sleep opportunities if the COT structure info obtained from GC-PDCCH explicitly or implicitly indicates that the UE may skip PDCCH monitoring for some number of slots.

In some embodiments, once the wideband DMRS is detected it starts decoding GC-PDCCH to obtain COT structure info. At this point, the UE also starts blind decoding of PDCCH to obtain potential DL/UL scheduling grants. In this way, wideband DMRS detection serves as a low complexity method for the UE to identify when a gNB DL transmission burst starts. Frequent monitoring of both GC-PDCCH and PDCCH occurs up until the first slot boundary in the COT (end of Phase 1). During Phase 1, typically Type B PDSCH mapping (mini-slot scheduling) is used to facilitate fine channel access granularity.

In Phase 2, depending on the control signalling described herein, the UE may attempt decoding of both GC-PDCCH and PDCCH with reduced frequency, e.g., once per slot, since after the first slot boundary, Type A PDSCH mapping (slot-based) can be used. Such reduced frequency PDCCH monitoring itself offers another power saving opportunity to the UE on top of that offered by C-DRX. Furthermore, depending on whether or not a UE has received an UL/DL scheduling grant within a COT, there may be additional sleep opportunities if the COT structure info obtained from GC-PDCCH explicitly or implicitly indicates that the UE may skip PDCCH monitoring for some number of slots.

In NR Rel-15, GC-PDCCH can be used to indicate to a group of UEs what the instantaneous TDD pattern looks like for the current and potentially future slots. This is achieved by signaling multiple slot format indicators (SFIs) using DCI Format 2_0 carried by GC-PDCCH. The multiple signaled SFIs correspond to the current slot and 0 up to 256 future slots. The actual DCI Format 2_0 signaling simply points to a row in an RRC configured table of SFI values, where each row contains a so-called slot format combination.

The SFI value for a particular slot indicates which symbols in the corresponding slot are classified as downlink/uplink/flexible ('D', 'U', or 'F'). Table 11.1.1-1 in 38.213 contains a list of possible SFI values. An SFI is simply an integer that takes a value from the range [0 . . . 55] or the value 255. Values in the range [56 . . . 254] are reserved for future use. A particular integer indicates a row in the table, where each row indicates the classification for all 14 OFDM symbols of a slot.

As discussed above, DMRS of GC-PDCCH can be used for the detection of a gNB DL transmission burst for NR-U. Hence GC-PDCCH is useful for dual purposes: burst detection and COT structure indication. One of the more important quantities to indicate is the COT duration and/or the end-of-COT. For example, this information may be used by a UE to control when it switches from performing Cat2 LBT (within a shared COT) to CAT4 LBT (outside the COT). To avoid additional DCI overhead and also minimize specification impact, it makes sense to leverage the existing SFI signalling in an efficient manner.

Figure 10:
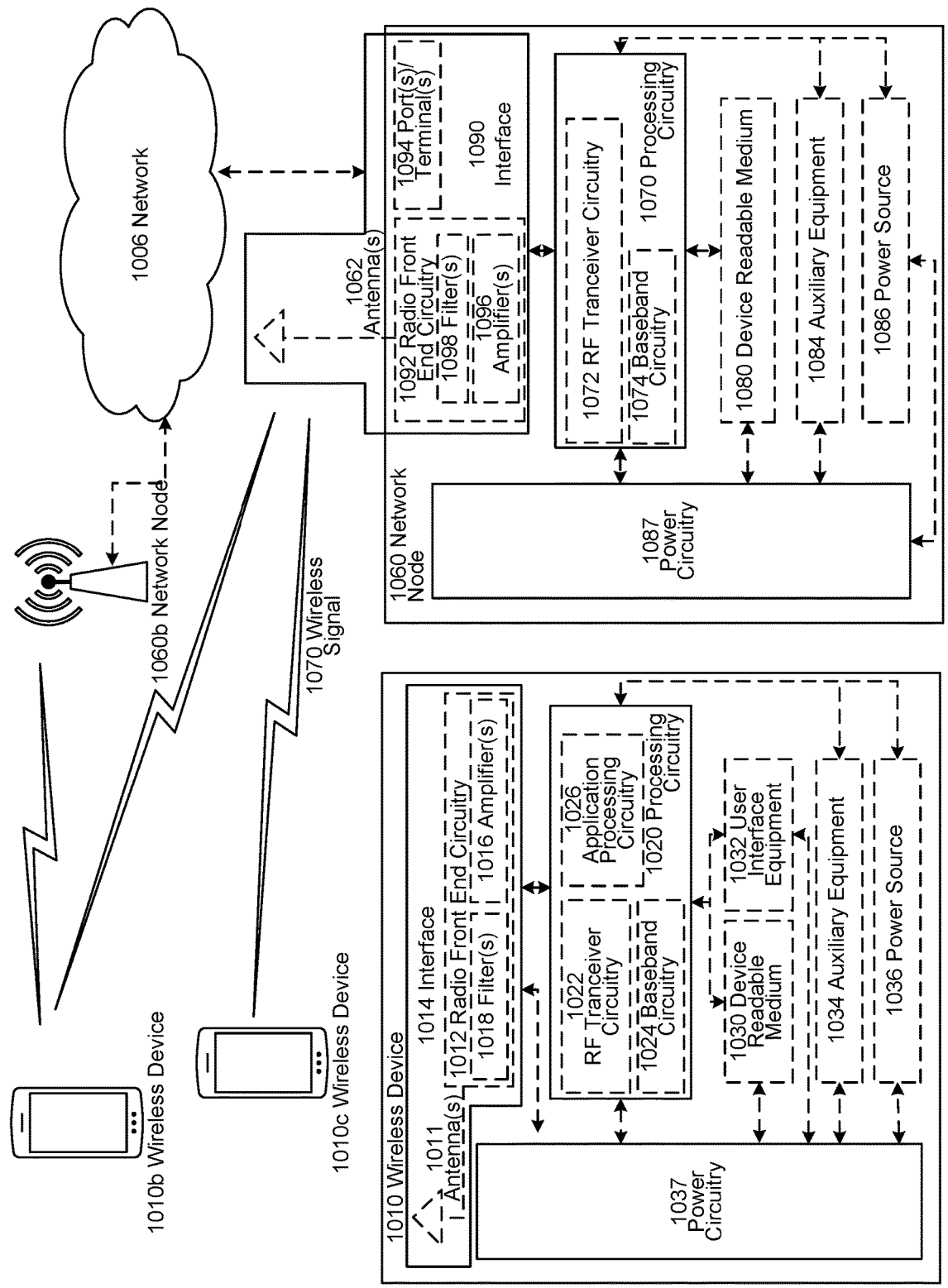
FIG. 10 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
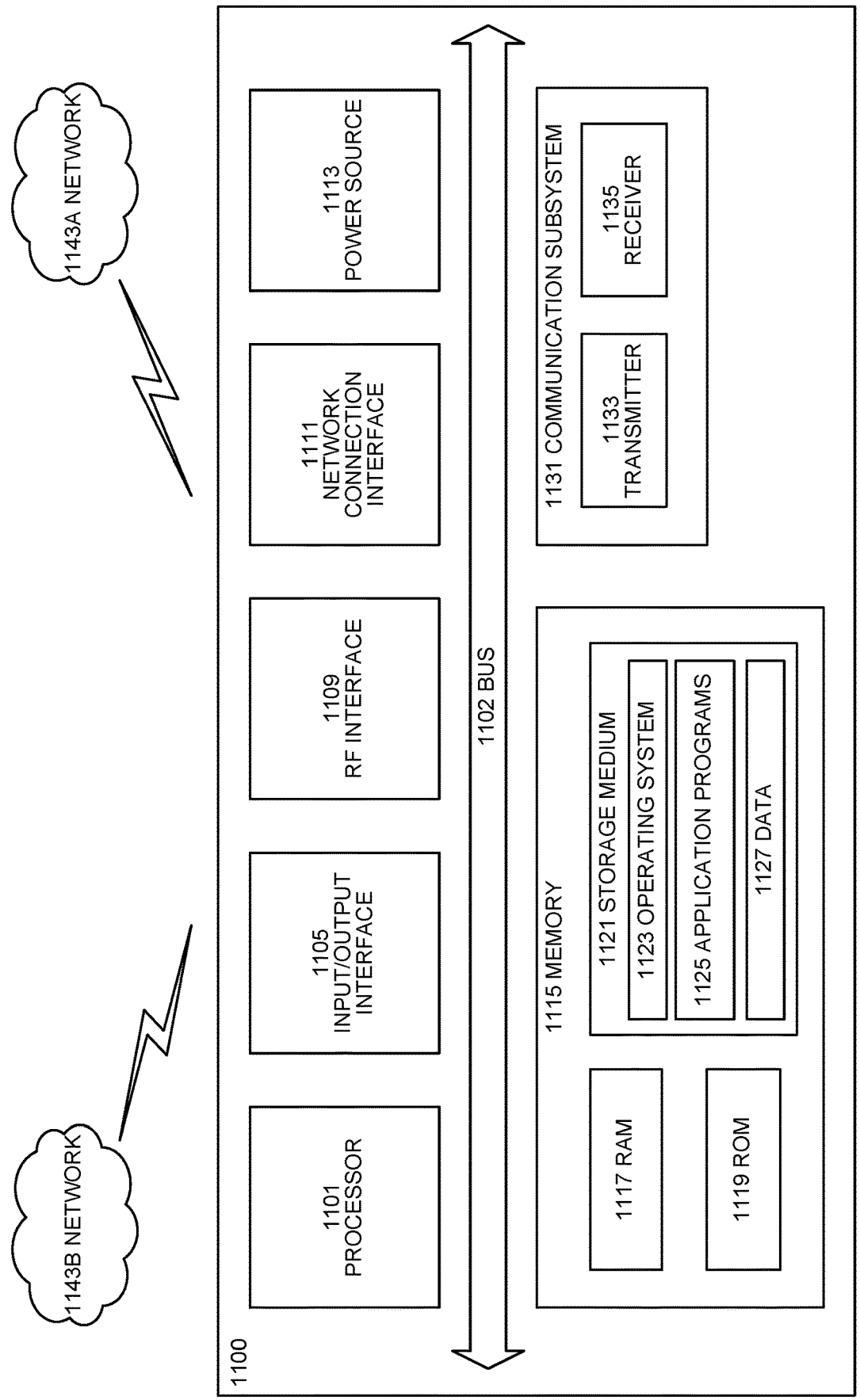
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
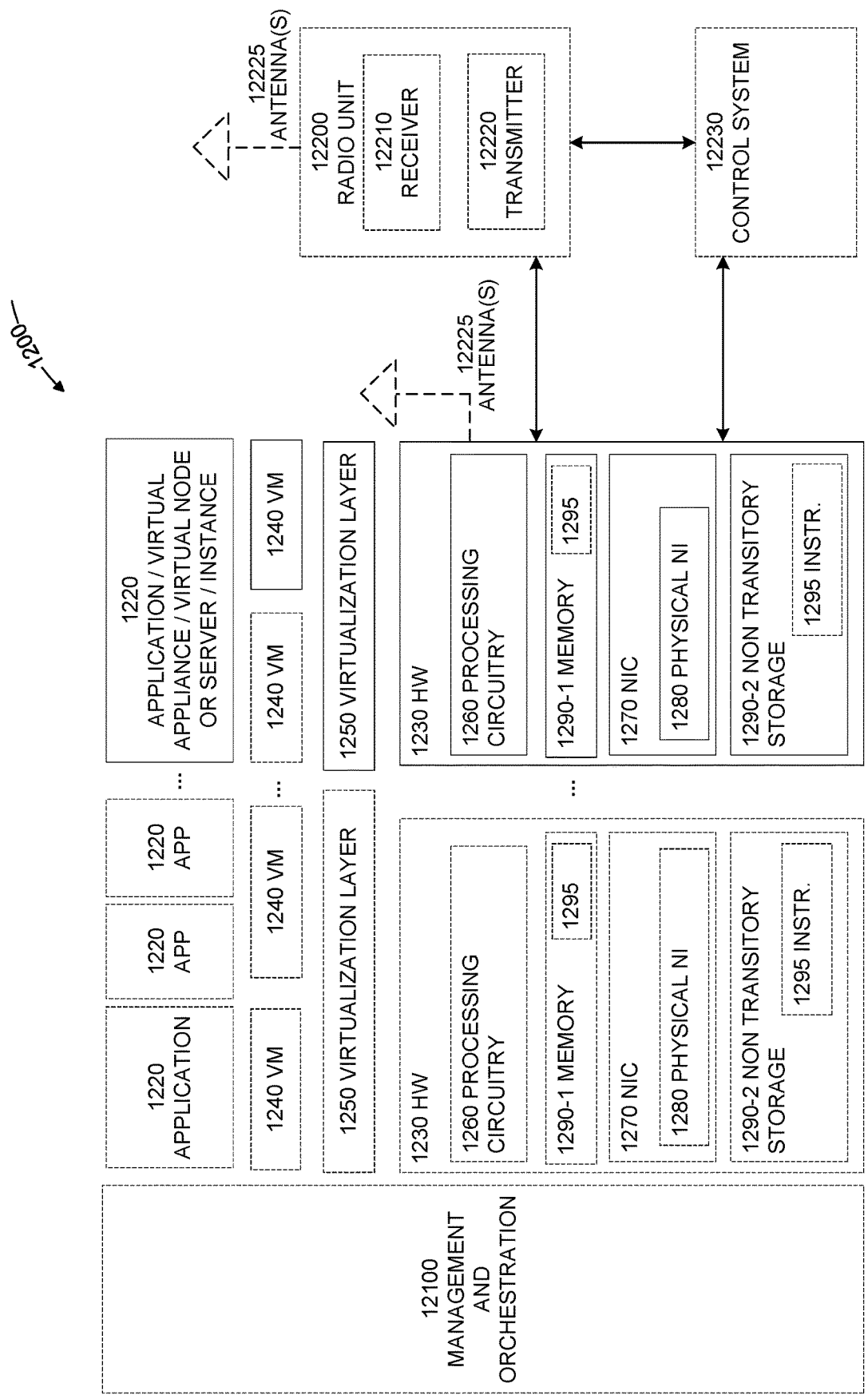
FIG. 12 is a block diagram of a virtualization environment according to some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
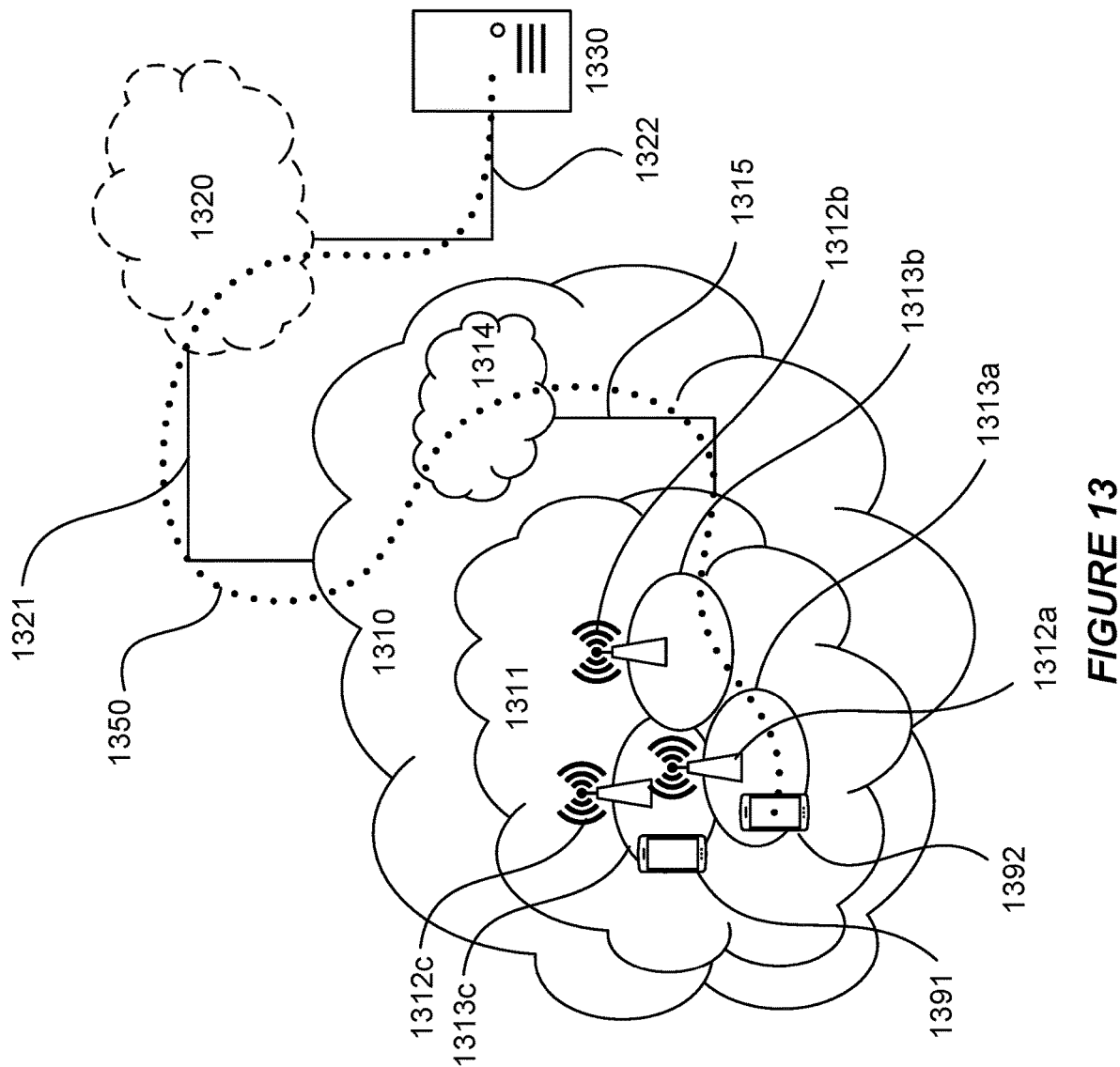
FIG. 13 is a block diagram of a communication network with a host computer according to some embodiments.

FIG. 13 illustrates a telecommunication network connected via an intermediate network to a host computer in accordance with some embodiments. In particular, with reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
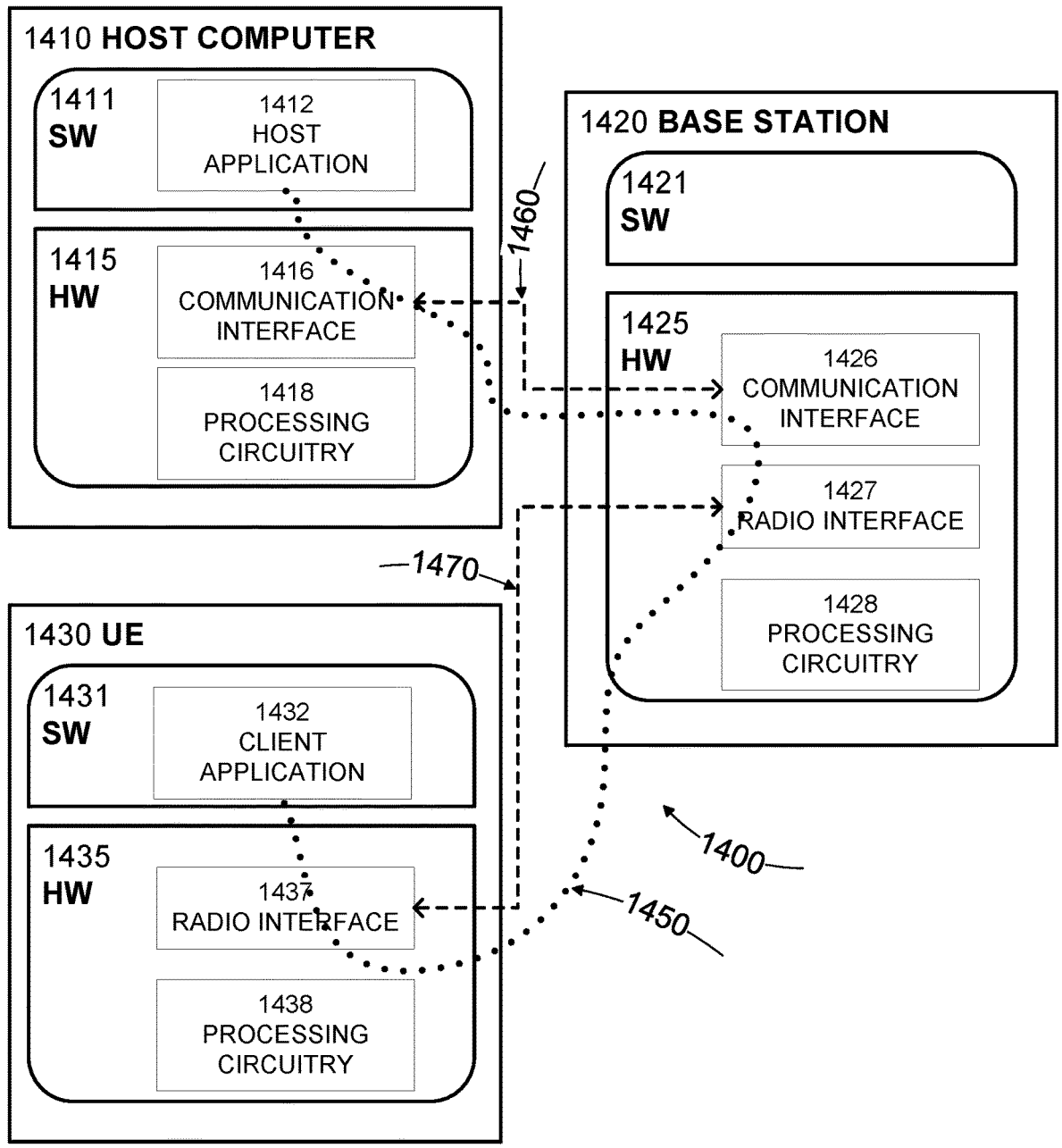
FIG. 14 is a block diagram of a host computer according to some embodiments.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve device power consumption and thereby provide benefits such as extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
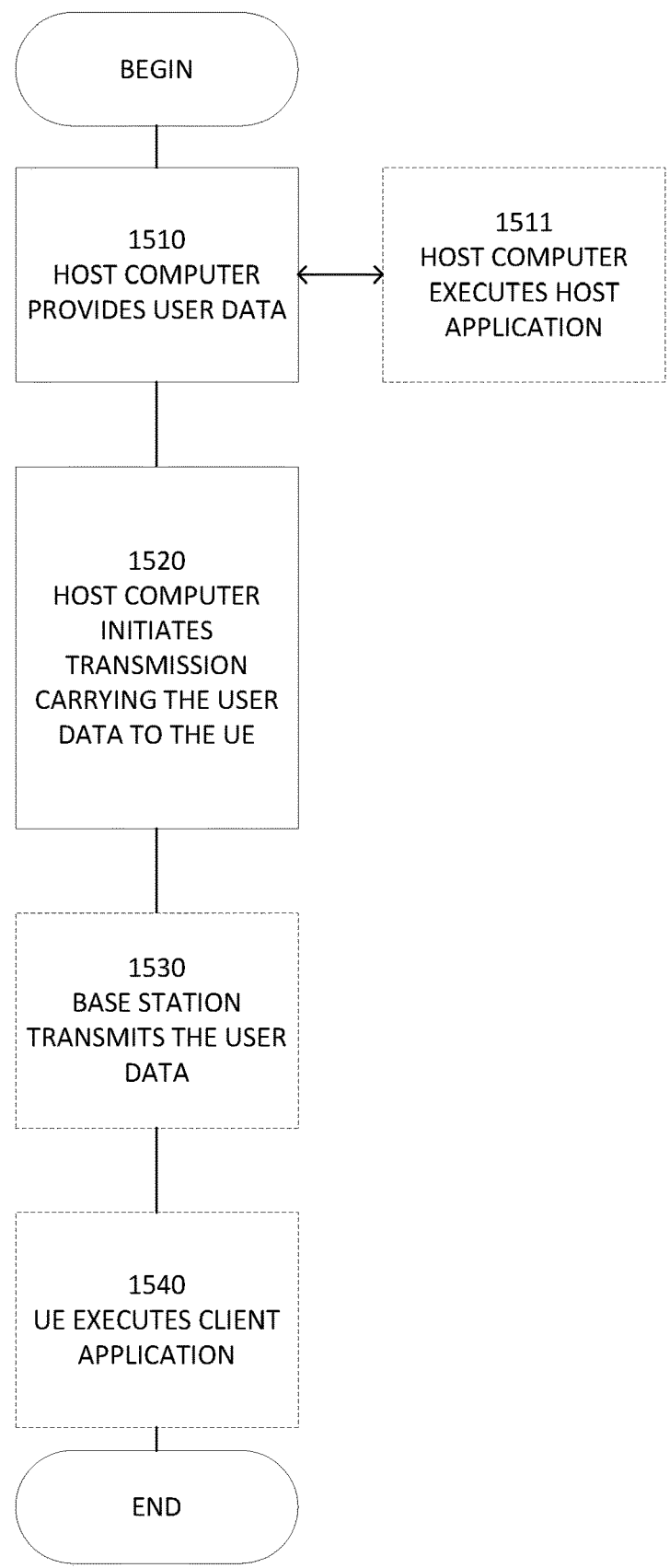
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
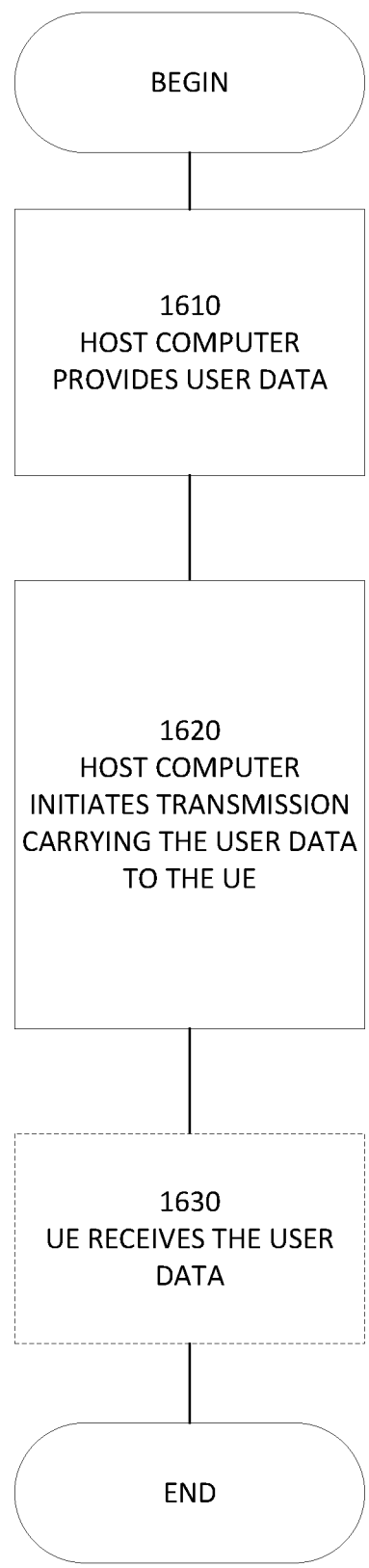
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
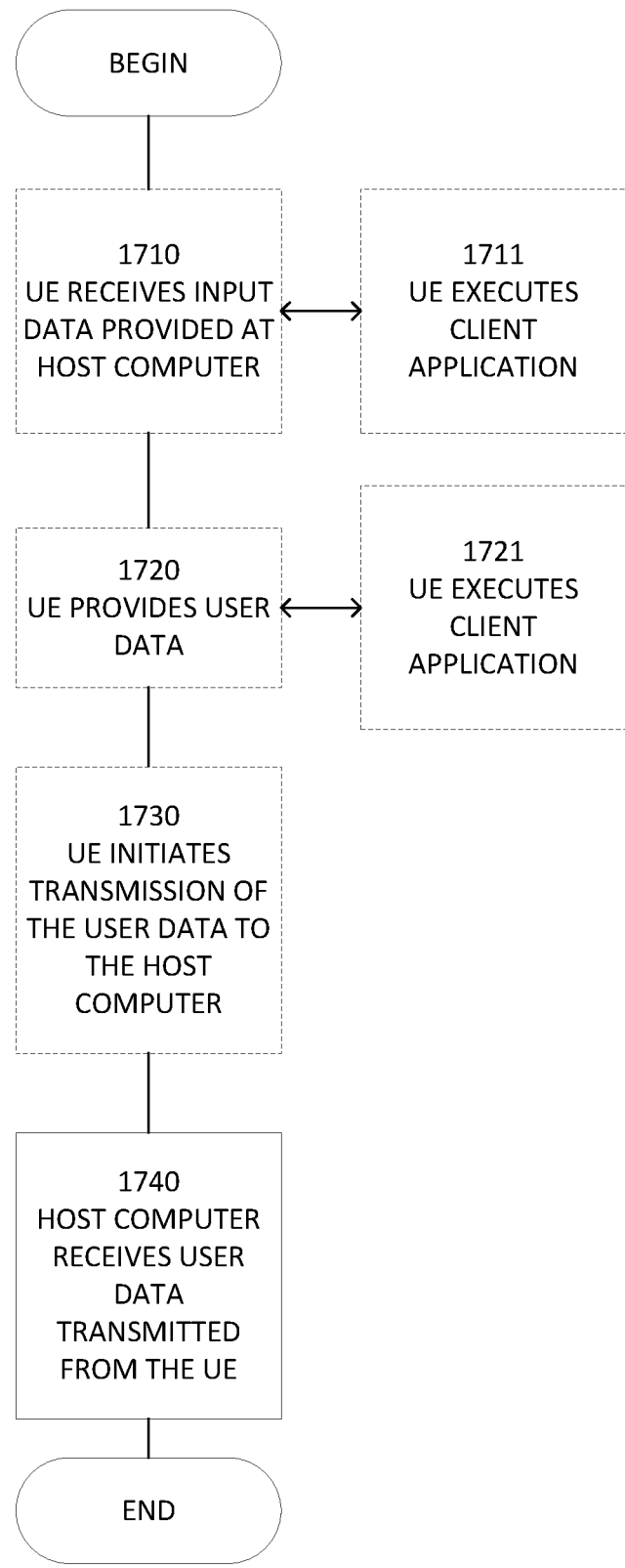
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
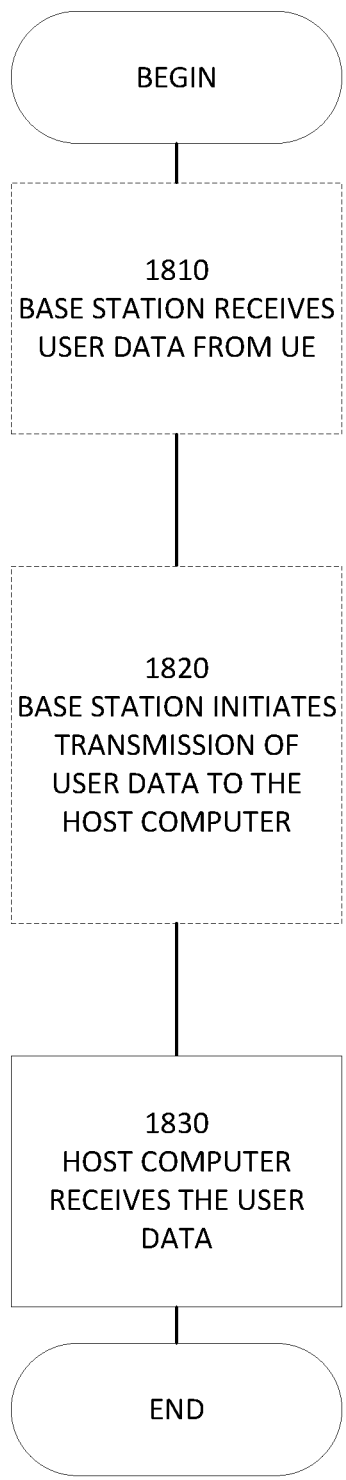
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

A1. A method performed by a wireless device configured for use in a wireless communication system, the method comprising:
  monitoring for and/or receiving control signaling indicating whether or not the wireless device will be scheduled to transmit or receive within a channel occupancy time, COT, period.

A2. The method of embodiment A1, further comprising:
  determining, based on whether or not the wireless device will be scheduled to transmit or receive within the COT period, a discontinuous reception, DRX, configuration to apply during the COT period; and
  applying the determined DRX configuration during the COT period.

A3. The method of embodiment A2, wherein said determining comprises determining whether to apply a short DRX configuration with a relatively short DRX cycle or a long DRX configuration with a relatively long DRX cycle, depending respectively on whether or not the wireless device will be scheduled to transmit or receive within the COT period, wherein the long DRX cycle is longer than the short DRX cycle.

A4. The method of any of embodiments A1-A3, further comprising:
  determining, based on whether or not the wireless device will be scheduled to transmit or receive within the COT period, how often or whether to monitor a dedicated control channel during the COT period for a scheduling grant or assignment indicating scheduling of the wireless device to transmit or receive; and
  monitoring or not monitoring the dedicated control channel according to said determining.

A5. The method of any of embodiments A1-A4, further comprising, responsive to determining from said monitoring and/or receiving that the wireless device will not be scheduled to transmit or receive during the COT period, refraining from monitoring a dedicated control channel during the COT period for a scheduling grant or assignment indicating scheduling of the wireless device to transmit or receive.

A6. The method of any of embodiments A1-A5, wherein the control signaling indicates one or more identifiers of one or more wireless devices, if any, that will be scheduled to transmit or receive within the COT period.

A7. The method of any of embodiments A1-A6, wherein the control signaling indicates that the wireless device will be scheduled to transmit or receive within the COT period.

A8. The method of any of embodiments A1-A7, wherein the control signaling indicates whether or not the wireless device will be scheduled to transmit or receive during the COT period by indicating whether or not the wireless device is to monitor a dedicated control channel during the COT period for a scheduling grant or assignment.

A9. The method of any of embodiments A1-A8, wherein the control signaling comprises or indicated by a group-common downlink control channel.

A10. The method of embodiment A9, wherein the group-common downlink control channel is addressed to a group of wireless devices that will be scheduled to transmit or receive within the COT period.

A11. The method of any of embodiments A9-A10, wherein said monitoring for comprises monitoring for a group-common downlink control channel addressed to a group of wireless devices to which the wireless device belongs, and wherein the method further comprises determining whether or not the wireless device will be scheduled to transmit or receive within the COT period based respectively on whether or not the wireless device receives a group-common downlink control channel addressed to said group of wireless devices to which the wireless device belongs.

A12. The method of any of embodiments A1-A9, wherein the control signaling is included in or accompanied by COT information that indicates a slot structure of the COT period.

A13. The method of any of embodiments A1-A12, comprising monitoring for and/or receiving the control signaling during a beginning portion of the COT period and/or in advance of receiving any scheduling assignment or grant for transmitting or receiving within the COT period.

A14. The method of any of embodiments A1-A9 and A13, wherein the control signaling comprises a trivial scheduling grant on a dedicated control channel, wherein the trivial scheduling grant allocates either no radio resources to the wireless device or allocates a minimum allowed number of radio resources to the wireless device.

A15. The method of any of embodiments A1-A14, wherein the COT period is a period of time for which a transmitter is able to occupy a channel in unlicensed frequency spectrum after having initiated a transmission burst on that channel, wherein the COT period is a shared COT period that the transmitter has shared with one or more other transmitters.

A16. The method of any of embodiments A1-A15, wherein the wireless communication system is a New Radio Unlicensed, NR-U, system.

A17. The method of any of embodiments A1-A16, comprising monitoring for and/or receiving the control signaling after receiving other control signaling indicating presence of a downlink or uplink transmission burst on a channel in unlicensed frequency spectrum.

A18. The method of any of embodiments A1-A17, wherein the control signaling further indicates which one or more services are allowed to be scheduled, are preferred to be scheduled, or will be scheduled within the COT period.

A19. A method performed by a wireless device configured for use in a wireless communication system, the method comprising:
monitoring for and/or receiving control signaling indicating presence of an uplink transmission burst initiated by one or more other wireless devices on a channel in unlicensed frequency spectrum.

A20. The method of embodiment 19, wherein the control signaling generically indicates presence of any of multiple possible types of transmission bursts on the channel in the unlicensed frequency spectrum, wherein the possible types include an uplink transmission burst initiated by one or more other wireless devices and a downlink transmission burst initiated by a radio network node.

A21. The method of any of embodiments A19-A20, wherein the control signaling comprises a demodulation reference signal, DMRS, in a group-common downlink control channel transmission.

A22. The method of any of embodiments A19-A21, wherein the wireless communication system is a New Radio Unlicensed, NR-U, system.

A23. A method performed by a wireless device configured for use in a wireless communication system, the method comprising:
monitoring for and/or receiving control signaling indicating which one or more services are allowed to be scheduled, are preferred to be scheduled, or will be scheduled within a channel occupancy time, COT, period.

A24. The method of embodiment A23, wherein the control signaling indicates the one or more services by indicating one or more logical channel identifiers, one or more logical channel group identifiers, one or more logical channel priority indicators, or one or more channel access priority classes.

A25. The method of embodiment A23, further comprising:
determining, based on the one or more services indicated, a discontinuous reception, DRX, configuration to apply during the COT period; and applying the determined DRX configuration during the COT period.

A26. The method of any of embodiments A23-A25, further comprising:
determining, based on the one or more services indicated, how often or whether to monitor a dedicated control channel during the COT period for a scheduling grant or assignment indicating scheduling of the wireless device to transmit or receive; and monitoring or not monitoring the dedicated control channel according to said determining.

A27. The method of any of embodiments A23-A26, wherein the control signaling further indicates one or more identifiers of one or more wireless devices, if any, that will be scheduled to transmit or receive within the COT period.

A28. The method of any of embodiments A23-A27, wherein the control signaling comprises or indicated by a group-common downlink control channel.

A29. The method of any of embodiments A23-A28, wherein the control signaling is included in or accompanied by COT information that indicates a slot structure of the COT period.

A30. The method of any of embodiments A23-A29, further comprising monitoring for and/or receiving the control signaling during a beginning portion of the COT period and/or in advance of receiving any scheduling assignment or grant for transmitting or receiving within the COT period.

A31. The method of any of embodiments A23-A30, wherein the COT period is a period of time for which a transmitter is able to occupy a channel in unlicensed frequency spectrum after having initiated a transmission burst on that channel, wherein the COT period is a shared COT period that the transmitter has shared with one or more other transmitters.

A32. The method of any of embodiments A23-A31, wherein the wireless communication system is a New Radio Unlicensed, NR-U, system.

A33. The method of any of embodiments A23-A32, comprising monitoring for and/or receiving the control signaling after receiving other control signaling indicating presence of a downlink or uplink transmission burst on a channel in unlicensed frequency spectrum.

A34. The method of any of embodiments A1-A33, wherein the control signaling comprises or is included in a medium access control (MAC) control element (CE) or a radio resource control (RRC) message.

A35. The method of any of embodiments A1-A18 and A23-A34, further comprising, based on the wireless device being scheduled to transmit or receive within the COT period, transmitting or receiving within the COT period.

AA. The method of any of the previous embodiments, further comprising: providing user data; and
forwarding the user data to a host computer via the transmission to the base station.

Group B Embodiments

B1. A method performed by a radio network node configured for use in a wireless communication system, the method comprising:
transmitting control signaling indicating whether or not a wireless device will be scheduled to transmit or receive within a channel occupancy time, COT, period.

B2. The method of embodiment 1, wherein the control signaling indicates which one or more wireless devices will be scheduled to transmit or receive within the COT period.

B3. The method of any of embodiments B2-B3, wherein the control signaling indicates one or more identifiers of one or more wireless devices that will be scheduled to transmit or receive within the COT period.

B4. The method of embodiment 1, wherein the control signaling indicates that the wireless device will be scheduled to transmit or receive within the COT period.

B5. The method of any of embodiments 1 and B4, wherein the control signaling indicates whether or not the wireless device will be scheduled to transmit or receive during the COT period by indicating whether or not the wireless device is to monitor a dedicated control channel during the COT period for a scheduling grant or assignment.

B6. The method of any of embodiments B1-B5, wherein the control signaling comprises or indicated by a group-common downlink control channel.

B7. The method of embodiment B6, wherein the group-common downlink control channel is addressed to a group of wireless devices that will be scheduled to transmit or receive within the COT period.

B8. The method of any of embodiments B1-B7, wherein the control signaling is included in or accompanied by COT information that indicates a slot structure of the COT period.

B9. The method of any of embodiments B1-B8, comprising transmitting the control signaling during a beginning portion of the COT period and/or in advance of transmitting any scheduling assignment or grant for transmitting or receiving within the COT period.

B10. The method of any of embodiments B1-B7 and B9, wherein the control signaling comprises a trivial scheduling grant on a dedicated control channel, wherein the trivial scheduling grant allocates either no radio resources to the wireless device or allocates a minimum allowed number of radio resources to the wireless device.

B11. The method of any of embodiments B1-B10, wherein the COT period is a period of time for which a transmitter is able to occupy a channel in unlicensed frequency spectrum after having initiated a transmission burst on that channel, wherein the COT period is a shared COT period that the transmitter has shared with one or more other transmitters.

B12. The method of any of embodiments B1-B11, wherein the wireless communication system is a New Radio Unlicensed, NR-U, system.

B13. The method of any of embodiments B1-AB12, comprising transmitting the control signaling after transmitting other control signaling indicating presence of a downlink or uplink transmission burst on a channel in unlicensed frequency spectrum.

B14. The method of any of embodiments B1-B13, wherein the control signaling further indicates which one or more services are allowed to be scheduled, are preferred to be scheduled, or will be scheduled within the COT period.

B15. A method performed by a radio network node configured for use in a wireless communication system, the method comprising:
 transmitting control signaling indicating presence of an uplink transmission burst initiated by one or more other wireless devices on a channel in unlicensed frequency spectrum.

B16. The method of embodiment B15, wherein the control signaling generically indicates presence of any of multiple possible types of transmission bursts on the channel in the unlicensed frequency spectrum, wherein the possible types include an uplink transmission burst initiated by one or more other wireless devices and a downlink transmission burst initiated by a radio network node.

B17. The method of any of embodiments B15-B16, wherein the control signaling comprises a demodulation reference signal, DMRS, in a group-common downlink control channel transmission.

B18. The method of any of embodiments B15-B17, wherein the wireless communication system is a New Radio Unlicensed, NR-U, system.

B19. A method performed by a radio network node configured for use in a wireless communication system, the method comprising:
 transmitting control signaling indicating which one or more services are allowed to be scheduled, are preferred to be scheduled, or will be scheduled within a channel occupancy time, COT, period.

B20. The method of embodiment B19, wherein the control signaling indicates the one or more services by indicating one or more logical channel identifiers, one or more logical channel group identifiers, one or more logical channel priority indicators, or one or more channel access priority classes.

B21. The method of any of embodiments B19-B20, wherein the control signaling further indicates one or more identifiers of one or more wireless devices, if any, that will be scheduled to transmit or receive within the COT period.

B22. The method of any of embodiments B19-B21, wherein the control signaling comprises or indicated by a group-common downlink control channel.

B23. The method of any of embodiments B19-B22, wherein the control signaling is included in or accompanied by COT information that indicates a slot structure of the COT period.

B24. The method of any of embodiments B19-B23, comprising transmitting the control signaling during a beginning portion of the COT period and/or in advance of transmitting any scheduling assignment or grant for transmitting or receiving within the COT period.

B25. The method of any of embodiments B19-B24, wherein the COT period is a period of time for which a transmitter is able to occupy a channel in unlicensed frequency spectrum after having initiated a transmission burst on that channel, wherein the COT period is a shared COT period that the transmitter has shared with one or more other transmitters.

B26. The method of any of embodiments B19-B25, wherein the wireless communication system is a New Radio Unlicensed, NR-U, system.

B27. The method of any of embodiments B19-B26, comprising transmitting the control signaling after transmitting other control signaling indicating presence of a downlink or uplink transmission burst on a channel in unlicensed frequency spectrum.

B28. The method of any of embodiments B1-B27, wherein the control signaling comprises or is included in a medium access control (MAC) control element (CE) or a radio resource control (RRC) message.

B29. The method of any of embodiments B1-B14 and B19-B28, further comprising, based on the wireless device being scheduled to transmit or receive within the COT period, transmitting or receiving within the COT period.

BB. The method of any of the previous embodiments, further comprising:
 obtaining user data; and
 forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
communication circuitry; and
processing circuitry configured to perform any of the steps of any of the Group A embodiments.

C4. A wireless device comprising:
processing circuitry configured to perform any of the steps of any of the Group A embodiments; and
power supply circuitry configured to supply power to the wireless device.

C5. A wireless device comprising:
processing circuitry and memory, the memory containing instructions executable by the processing circuitry whereby the wireless device is configured to perform any of the steps of any of the Group A embodiments.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B embodiments.

C10. A radio network node comprising processing circuitry configured to perform any of the steps of any of the Group B embodiments.

C11. A radio network node comprising:
communication circuitry; and
processing circuitry configured to perform any of the steps of any of the Group B embodiments.

C12. A radio network node comprising:
processing circuitry configured to perform any of the steps of any of the Group B embodiments;
power supply circuitry configured to supply power to the radio network node.

C13. A radio network node comprising:
processing circuitry and memory, the memory containing instructions executable by the processing circuitry whereby the radio network node is configured to perform any of the steps of any of the Group B embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device configured for use in a wireless communication system, the method comprising:
    monitoring for control signaling comprising an indication of which one or more wireless devices will be scheduled to transmit or receive within a channel occupancy time (COT) period;
    determining, based on the indication of the control signaling, whether the wireless device will be scheduled within the COT period; and monitoring or not monitoring a dedicated control channel during the COT period for a scheduling grant or assignment indicating scheduling of the wireless device according to said determining, wherein the control signaling comprises a trivial scheduling grant on a dedicated control channel, and wherein the trivial scheduling grant allocates either no radio resources to the wireless device or allocates a minimum allowed number of radio resources to the wireless device.

2. The method of claim 1, further comprising:
determining, based on the indication of the control signaling, a discontinuous reception (DRX) configuration to apply during the COT period; and
applying the determined DRX configuration during the COT period.

3. The method of claim 2, wherein said determining the DRX configuration to apply during the COT period comprises determining whether to apply a short DRX configuration with a short DRX cycle or a long DRX configuration with a long DRX cycle, depending respectively on whether or not the wireless device will be scheduled to transmit or receive within the COT period according to the indication of the control signaling, wherein the long DRX cycle is longer than the short DRX cycle.

4. The method of claim 1, wherein the control signaling indicates which one or more wireless devices will be scheduled to transmit or receive during the COT period by indicating which one or more wireless devices are to monitor a dedicated control channel during the COT period for a scheduling grant or assignment.

5. The method of claim 1, wherein said monitoring comprises monitoring for a group-common downlink control channel addressed to a group of wireless devices to which the wireless device belongs, and wherein the method further comprises determining whether or not the wireless device will be scheduled to transmit or receive within the COT period based respectively on whether or not the wireless device receives a group-common downlink control channel addressed to said group of wireless devices to which the wireless device belongs.

6. The method of claim 1, wherein the control signaling is included in or accompanied by COT information that indicates a slot structure of the COT period, and wherein the method comprises monitoring for the control signaling during a beginning portion of the COT period and/or in advance of receiving any scheduling assignment or grant for transmitting or receiving within the COT period.

7. The method of claim 1, wherein the COT period is a period of time for which a transmitter is able to occupy a channel in unlicensed frequency spectrum after having initiated a transmission burst on that channel, wherein the COT period is a shared COT period that the transmitter has shared with one or more other transmitters.

8. The method of claim 1, comprising monitoring for the control signaling after receiving other control signaling indicating presence of a downlink or uplink transmission burst on a channel in unlicensed frequency spectrum.

9. The method of claim 1, wherein the control signaling further indicates which one or more services are allowed to be scheduled, are preferred to be scheduled, or will be scheduled within the COT period.

10. The method of claim 1, further comprising, based on the wireless device being scheduled to transmit or receive within the COT period, transmitting or receiving within the COT period.

11. A method performed by a radio network node configured for use in a wireless communication system, the method comprising:
transmitting control signaling comprising an indication of which one or more wireless devices will be scheduled to transmit or receive within a channel occupancy time (COT) period; and
transmitting, to each of the one or more wireless devices that will be scheduled to transmit or receive within the COT period, a scheduling grant or assignment indicating scheduling of the wireless device on a dedicated control channel during the COT period, wherein, for each of the one or more wireless devices that will be scheduled to transmit or receive within the COT period, the control signaling comprises a trivial scheduling grant on a dedicated control channel, and wherein the trivial scheduling grant allocates either no radio resources to the wireless device or allocates a minimum allowed number of radio resources to the wireless device.

12. The method of claim 11, wherein the control signaling comprises or is indicated by a group-common downlink control channel, wherein the group-common downlink control channel is addressed to a group of wireless devices that will be scheduled to transmit or receive within the COT period.

13. The method of claim 11, wherein the control signaling is included in or accompanied by COT information that indicates a slot structure of the COT period, and wherein the method comprises transmitting the control signaling during a beginning portion of the COT period and/or in advance of transmitting any scheduling assignment or grant for transmitting or receiving within the COT period.

14. The method of claim 11, wherein the COT period is a period of time for which a transmitter is able to occupy a channel in unlicensed frequency spectrum after having initiated a transmission burst on that channel, wherein the COT period is a shared COT period that the transmitter has shared with one or more other transmitters.

15. The method of claim 11, comprising transmitting the control signaling after transmitting other control signaling indicating presence of a downlink or uplink transmission burst on a channel in unlicensed frequency spectrum.

16. The method of claim 11, wherein the control signaling further indicates which one or more services are allowed to be scheduled, are preferred to be scheduled, or will be scheduled within the COT period.

17. The method of claim 11, further comprising, based on the one or more wireless device being scheduled to transmit or receive within the COT period, transmitting or receiving within the COT period.

18. A wireless device configured for use in a wireless communication system, the wireless device comprising:
communication circuitry; and
processing circuitry configured to:
monitor for control signaling comprising an indication of which one or more wireless devices will be scheduled to transmit or receive within a channel occupancy time (COT) period;
determine, based on the indication of the control signaling, whether the wireless device will be scheduled within the COT period; and
monitor or not monitor a dedicated control channel during the COT period for a scheduling grant or assignment indicating scheduling of the wireless device according to said determining, wherein the control signaling comprises a trivial scheduling grant on a dedicated control channel, and wherein the trivial scheduling grant allocates either no radio resources to the wireless device or allocates a minimum allowed number of radio resources to the wireless device.

19. A radio network node configured for use in a wireless communication system, the radio network node comprising:
communication circuitry; and
processing circuitry configured to:
  transmit control signaling comprising an indication of which one or more wireless devices will be scheduled to transmit or receive within a channel occupancy time (COT) period; and
  transmit, to each of the one or more wireless devices that will be scheduled to transmit or receive within the COT period, a scheduling grant or assignment indicating scheduling of the wireless device on a dedicated control channel during the COT period, wherein, for each of the one or more wireless devices that will be scheduled to transmit or receive within the COT period, the control signaling comprises a trivial scheduling grant on a dedicated control channel, and wherein the trivial scheduling grant allocates either no radio resources to the wireless device or allocates a minimum allowed number of radio resources to the wireless device.

\* \* \* \* \*